(12) United States Patent
Sakhdari et al.

(10) Patent No.: US 11,960,286 B2
(45) Date of Patent: Apr. 16, 2024

(54) METHOD, SYSTEM AND APPARATUS FOR DYNAMIC TASK SEQUENCING

(71) Applicant: ZEBRA TECHNOLOGIES CORPORATION, Lincolnshire, IL (US)

(72) Inventors: Bijan Sakhdari, Waterloo (CA); Sadegh Tajeddin, Mississauga (CA); Zi Cong Guo, Mississauga (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 95 days.

(21) Appl. No.: 16/429,906

(22) Filed: Jun. 3, 2019

(65) Prior Publication Data
US 2020/0379468 A1 Dec. 3, 2020

(51) Int. Cl.
*G05D 1/02* (2020.01)
*G05D 1/00* (2006.01)

(52) U.S. Cl.
CPC ......... *G05D 1/0214* (2013.01); *G05D 1/0238* (2013.01); *G05D 2201/02* (2013.01); *G05D 2201/0216* (2013.01)

(58) Field of Classification Search
CPC ......... G05D 1/0214; G05D 2201/0216; G05D 2201/02; G05D 1/0238
See application file for complete search history.

(56) References Cited

U.S. PATENT DOCUMENTS

| 5,209,712 A | 5/1993 | Ferri |
| 5,214,615 A | 5/1993 | Bauer |
| 5,408,322 A | 4/1995 | Hsu et al. |

(Continued)

FOREIGN PATENT DOCUMENTS

| CA | 2835830 | 11/2012 |
| CA | 3028156 | 1/2018 |

(Continued)

OTHER PUBLICATIONS

Dubois, M., et al., A comparison of geometric and energy-based point cloud semantic segmentation methods, European Conference on Mobile Robots (ECMR), p. 88-93, Sep. 25-27, 2013.

(Continued)

*Primary Examiner* — Christian Chace
*Assistant Examiner* — Shayne M. Gilbertson

(57) ABSTRACT

A method in a navigational controller includes: obtaining (i) a plurality of task fragments identifying respective sets of sub-regions in a facility, and (ii) an identifier of a task to be performed by a mobile automation apparatus at each of the sets of sub-regions; selecting an active one of the task fragments according to a sequence specifying an order of execution of the task fragments; generating a path including (i) a taxi portion from a current position of the mobile automation apparatus to the sub-regions identified by the active task fragment, and (ii) an execution portion traversing the sub-regions identified by the active task fragment; during travel along the taxi portion, determining, based on a current pose of the mobile automation apparatus, whether to initiate execution of another task fragment; and when the determination is affirmative, updating the sequence to mark the other task fragment as the active task fragment.

18 Claims, 12 Drawing Sheets

(56) References Cited

U.S. PATENT DOCUMENTS

| | | |
|---|---|---|
| 5,414,268 A | 5/1995 | McGee |
| 5,423,617 A | 6/1995 | Marsh et al. |
| 5,534,762 A | 7/1996 | Kim |
| 5,566,280 A | 10/1996 | Fukui et al. |
| 5,704,049 A | 12/1997 | Briechle |
| 5,953,055 A | 9/1999 | Huang et al. |
| 5,988,862 A | 11/1999 | Kacyra et al. |
| 6,026,376 A | 2/2000 | Kenney |
| 6,034,379 A | 3/2000 | Bunte et al. |
| 6,075,905 A | 6/2000 | Herman et al. |
| 6,115,114 A | 9/2000 | Berg et al. |
| 6,141,293 A | 10/2000 | Amorai-Moriya et al. |
| 6,304,855 B1 | 10/2001 | Burke |
| 6,442,507 B1 | 8/2002 | Skidmore et al. |
| 6,549,825 B2 | 4/2003 | Kurata |
| 6,580,441 B2 | 6/2003 | Schileru-Key |
| 6,711,293 B1 | 3/2004 | Lowe |
| 6,721,723 B1 | 4/2004 | Gibson et al. |
| 6,721,769 B1 | 4/2004 | Rappaport et al. |
| 6,836,567 B1 | 12/2004 | Silver et al. |
| 6,995,762 B1 | 2/2006 | Pavlidis et al. |
| 7,090,135 B2 | 8/2006 | Patel |
| 7,137,207 B2 | 11/2006 | Armstrong et al. |
| 7,245,558 B2 | 7/2007 | Willins et al. |
| 7,248,754 B2 | 7/2007 | Cato |
| 7,277,187 B2 | 10/2007 | Smith et al. |
| 7,373,722 B2 | 5/2008 | Cooper et al. |
| 7,474,389 B2 | 1/2009 | Greenberg et al. |
| 7,487,595 B2 | 2/2009 | Armstrong et al. |
| 7,493,336 B2 | 2/2009 | Noonan |
| 7,508,794 B2 | 3/2009 | Feather et al. |
| 7,527,205 B2 | 5/2009 | Zhu et al. |
| 7,605,817 B2 | 10/2009 | Zhang et al. |
| 7,647,752 B2 | 1/2010 | Magnell |
| 7,693,757 B2 | 4/2010 | Zimmerman |
| 7,726,575 B2 | 6/2010 | Wang et al. |
| 7,751,928 B1 | 7/2010 | Antony et al. |
| 7,783,383 B2 | 8/2010 | Eliuk et al. |
| 7,839,531 B2 | 11/2010 | Sugiyama |
| 7,845,560 B2 | 12/2010 | Emanuel et al. |
| 7,885,865 B2 | 2/2011 | Benson et al. |
| 7,925,114 B2 | 4/2011 | Mai et al. |
| 7,957,998 B2 | 6/2011 | Riley et al. |
| 7,996,179 B2 | 8/2011 | Lee et al. |
| 8,009,864 B2 | 8/2011 | Linaker et al. |
| 8,049,621 B1 | 11/2011 | Egan |
| 8,091,782 B2 | 1/2012 | Cato et al. |
| 8,094,902 B2 | 1/2012 | Crandall et al. |
| 8,094,937 B2 | 1/2012 | Teoh et al. |
| 8,132,728 B2 | 3/2012 | Dwinell et al. |
| 8,134,717 B2 | 3/2012 | Pangrazio et al. |
| 8,189,855 B2 | 5/2012 | Opalach et al. |
| 8,199,977 B2 | 6/2012 | Krishnaswamy et al. |
| 8,207,964 B1 | 6/2012 | Meadow et al. |
| 8,233,055 B2 | 7/2012 | Matsunaga et al. |
| 8,260,742 B2 | 9/2012 | Cognigni et al. |
| 8,265,895 B2 | 9/2012 | Willins et al. |
| 8,277,396 B2 | 10/2012 | Scott et al. |
| 8,284,988 B2 | 10/2012 | Sones et al. |
| 8,423,431 B1 | 4/2013 | Rouaix et al. |
| 8,429,004 B2 | 4/2013 | Hamilton et al. |
| 8,463,079 B2 | 6/2013 | Ackley et al. |
| 8,479,996 B2 | 7/2013 | Barkan et al. |
| 8,520,067 B2 | 8/2013 | Ersue |
| 8,542,252 B2 | 9/2013 | Perez et al. |
| 8,571,314 B2 | 10/2013 | Tao et al. |
| 8,599,303 B2 | 12/2013 | Stettner |
| 8,630,924 B2 | 1/2014 | Groenevelt et al. |
| 8,660,338 B2 | 2/2014 | Ma et al. |
| 8,743,176 B2 | 6/2014 | Stettner et al. |
| 8,757,479 B2 | 6/2014 | Clark et al. |
| 8,812,226 B2 | 8/2014 | Zeng |
| 8,923,893 B2 | 12/2014 | Austin et al. |
| 8,939,369 B2 | 1/2015 | Olmstead et al. |
| 8,954,188 B2 | 2/2015 | Sullivan et al. |
| 8,958,911 B2 | 2/2015 | Wong et al. |
| 8,971,637 B1 | 3/2015 | Rivard |
| 8,989,342 B2 | 3/2015 | Liesenfelt et al. |
| 9,007,601 B2 | 4/2015 | Steffey et al. |
| 9,037,287 B1 | 5/2015 | Grauberger et al. |
| 9,064,394 B1 | 6/2015 | Trundle |
| 9,070,285 B1 | 6/2015 | Ramu et al. |
| 9,072,929 B1 | 7/2015 | Rush et al. |
| 9,120,622 B1 | 9/2015 | Elazary et al. |
| 9,129,277 B2 | 9/2015 | Macintosh |
| 9,135,491 B2 | 9/2015 | Morandi et al. |
| 9,159,047 B2 | 10/2015 | Winkel |
| 9,171,442 B2 | 10/2015 | Clements |
| 9,247,211 B2 | 1/2016 | Zhang et al. |
| 9,329,269 B2 | 5/2016 | Zeng |
| 9,349,076 B1 | 5/2016 | Liu et al. |
| 9,367,831 B1 | 6/2016 | Besehanic |
| 9,380,222 B2 | 6/2016 | Clayton et al. |
| 9,396,554 B2 | 7/2016 | Williams et al. |
| 9,400,170 B2 | 7/2016 | Steffey |
| 9,424,482 B2 | 8/2016 | Patel et al. |
| 9,517,767 B1 | 12/2016 | Kentley et al. |
| 9,542,746 B2 | 1/2017 | Wu et al. |
| 9,549,125 B1 | 1/2017 | Goyal et al. |
| 9,562,971 B2 | 2/2017 | Shenkar et al. |
| 9,565,400 B1 | 2/2017 | Curlander et al. |
| 9,589,353 B2 | 3/2017 | Mueller-Fischer et al. |
| 9,600,731 B2 | 3/2017 | Yasunaga et al. |
| 9,600,892 B2 | 3/2017 | Patel et al. |
| 9,612,123 B1 | 4/2017 | Levinson et al. |
| 9,639,935 B1 | 5/2017 | Douady-Pleven et al. |
| 9,697,429 B2 | 7/2017 | Patel et al. |
| 9,766,074 B2 | 9/2017 | Roumeliotis et al. |
| 9,778,388 B1 | 10/2017 | Connor |
| 9,779,205 B2 | 10/2017 | Namir |
| 9,791,862 B1 | 10/2017 | Connor |
| 9,805,240 B1 | 10/2017 | Zheng et al. |
| 9,811,754 B2 | 11/2017 | Schwartz |
| 9,827,683 B1 | 11/2017 | Hance et al. |
| 9,880,009 B2 | 1/2018 | Bell |
| 9,928,708 B2 | 3/2018 | Lin et al. |
| 9,953,420 B2 | 4/2018 | Wolski et al. |
| 9,980,009 B2 | 5/2018 | Jiang et al. |
| 9,994,339 B2 | 6/2018 | Colson et al. |
| 9,996,818 B1 | 6/2018 | Ren et al. |
| 10,019,803 B2 | 7/2018 | Venable et al. |
| 10,111,646 B2 | 10/2018 | Nycz et al. |
| 10,121,072 B1 | 11/2018 | Kekatpure |
| 10,127,438 B1 | 11/2018 | Fisher et al. |
| 10,197,400 B2 | 2/2019 | Jesudason et al. |
| 10,210,603 B2 | 2/2019 | Venable et al. |
| 10,229,386 B2 | 3/2019 | Thomas |
| 10,248,653 B2 | 4/2019 | Blassin et al. |
| 10,262,294 B1 | 4/2019 | Hahn et al. |
| 10,265,871 B2 | 4/2019 | Hance et al. |
| 10,289,990 B2 | 5/2019 | Rizzolo et al. |
| 10,336,543 B1 | 7/2019 | Sills et al. |
| 10,349,031 B2 | 7/2019 | DeLuca |
| 10,352,689 B2 | 7/2019 | Brown et al. |
| 10,373,116 B2 | 8/2019 | Medina et al. |
| 10,394,244 B2 | 8/2019 | Song et al. |
| 2001/0031069 A1 | 10/2001 | Kondo et al. |
| 2001/0041948 A1 | 11/2001 | Ross et al. |
| 2002/0006231 A1 | 1/2002 | Jayant et al. |
| 2002/0059202 A1 | 5/2002 | Hadzikadic et al. |
| 2002/0097439 A1 | 7/2002 | Braica |
| 2002/0146170 A1 | 10/2002 | Rom |
| 2002/0158453 A1 | 10/2002 | Levine |
| 2002/0164236 A1 | 11/2002 | Fukuhara et al. |
| 2003/0003925 A1 | 1/2003 | Suzuki |
| 2003/0094494 A1 | 5/2003 | Blanford et al. |
| 2003/0174891 A1 | 9/2003 | Wenzel et al. |
| 2004/0021313 A1 | 2/2004 | Gardner et al. |
| 2004/0084527 A1 | 5/2004 | Bong et al. |
| 2004/0131278 A1 | 7/2004 | Imagawa et al. |
| 2004/0240754 A1 | 12/2004 | Smith et al. |
| 2005/0016004 A1 | 1/2005 | Armstrong et al. |
| 2005/0114059 A1 | 5/2005 | Chang et al. |
| 2005/0174351 A1 | 8/2005 | Chang |

(56) References Cited

U.S. PATENT DOCUMENTS

| | | |
|---|---|---|
| 2005/0213082 A1 | 9/2005 | DiBernardo et al. |
| 2005/0213109 A1 | 9/2005 | Schell et al. |
| 2006/0032915 A1 | 2/2006 | Schwartz |
| 2006/0045325 A1 | 3/2006 | Zavadsky et al. |
| 2006/0064286 A1* | 3/2006 | Fink .................... G05D 1/0038 701/117 |
| 2006/0106742 A1 | 5/2006 | Bochicchio et al. |
| 2006/0279527 A1 | 12/2006 | Zehner et al. |
| 2006/0285486 A1 | 12/2006 | Roberts et al. |
| 2007/0036398 A1 | 2/2007 | Chen et al. |
| 2007/0074410 A1 | 4/2007 | Armstrong et al. |
| 2007/0272732 A1 | 11/2007 | Hindmon |
| 2008/0002866 A1 | 1/2008 | Fujiwara |
| 2008/0025565 A1 | 1/2008 | Zhang et al. |
| 2008/0027591 A1 | 1/2008 | Lenser et al. |
| 2008/0077511 A1 | 3/2008 | Zimmerman |
| 2008/0159634 A1 | 7/2008 | Sharma et al. |
| 2008/0164310 A1 | 7/2008 | Dupuy et al. |
| 2008/0175513 A1 | 7/2008 | Lai et al. |
| 2008/0181529 A1 | 7/2008 | Michel et al. |
| 2008/0183730 A1 | 7/2008 | Enga |
| 2008/0238919 A1 | 10/2008 | Pack |
| 2008/0294487 A1 | 11/2008 | Nasser |
| 2009/0009123 A1 | 1/2009 | Skaff |
| 2009/0024353 A1 | 1/2009 | Lee et al. |
| 2009/0057411 A1 | 3/2009 | Madej et al. |
| 2009/0059270 A1 | 3/2009 | Opalach et al. |
| 2009/0060349 A1 | 3/2009 | Linaker et al. |
| 2009/0063306 A1 | 3/2009 | Fano et al. |
| 2009/0063307 A1 | 3/2009 | Groenovelt et al. |
| 2009/0074303 A1 | 3/2009 | Filimonova et al. |
| 2009/0088975 A1 | 4/2009 | Sato et al. |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |
| 2009/0287587 A1 | 11/2009 | Bloebaum et al. |
| 2009/0323121 A1 | 12/2009 | Valkenburg et al. |
| 2010/0017407 A1 | 1/2010 | Beniyama et al. |
| 2010/0026804 A1 | 2/2010 | Tanizaki et al. |
| 2010/0070365 A1 | 3/2010 | Siotia et al. |
| 2010/0082194 A1 | 4/2010 | Yabushita et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0161569 A1 | 6/2010 | Schreter |
| 2010/0171826 A1 | 7/2010 | Hamilton et al. |
| 2010/0208039 A1 | 8/2010 | Setettner |
| 2010/0214873 A1 | 8/2010 | Somasundaram et al. |
| 2010/0235033 A1 | 9/2010 | Yamamoto et al. |
| 2010/0241289 A1 | 9/2010 | Sandberg |
| 2010/0257149 A1 | 10/2010 | Cognigni et al. |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0216063 A1 | 9/2011 | Hayes |
| 2011/0242286 A1 | 10/2011 | Pace et al. |
| 2011/0246503 A1 | 10/2011 | Bender et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0017028 A1 | 1/2012 | Tsirkin |
| 2012/0019393 A1 | 1/2012 | Wolinsky et al. |
| 2012/0022913 A1 | 1/2012 | Volkmann et al. |
| 2012/0051730 A1 | 3/2012 | Cote et al. |
| 2012/0069051 A1 | 3/2012 | Hagbi et al. |
| 2012/0075342 A1 | 3/2012 | Choubassi et al. |
| 2012/0133639 A1 | 5/2012 | Kopf et al. |
| 2012/0169530 A1 | 7/2012 | Padmanabhan et al. |
| 2012/0185112 A1 | 7/2012 | Sung et al. |
| 2012/0194644 A1 | 8/2012 | Newcombe et al. |
| 2012/0197464 A1 | 8/2012 | Wang et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0287249 A1 | 11/2012 | Choo et al. |
| 2012/0307108 A1 | 12/2012 | Forutanpour |
| 2012/0323620 A1 | 12/2012 | Hofman et al. |
| 2013/0030700 A1 | 1/2013 | Miller et al. |
| 2013/0076586 A1 | 3/2013 | Karhuketo et al. |
| 2013/0090881 A1 | 4/2013 | Janardhanan et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0142421 A1 | 6/2013 | Silver et al. |
| 2013/0144565 A1 | 6/2013 | Miller et al. |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahem et al. |
| 2013/0232039 A1 | 9/2013 | Jackson et al. |
| 2013/0235165 A1 | 9/2013 | Gharib et al. |
| 2013/0235206 A1 | 9/2013 | Smith et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2013/0342363 A1 | 12/2013 | Paek et al. |
| 2014/0002597 A1 | 1/2014 | Taguchi et al. |
| 2014/0003655 A1 | 1/2014 | Gopalkrishnan et al. |
| 2014/0003727 A1 | 1/2014 | Lortz et al. |
| 2014/0006229 A1 | 1/2014 | Birch et al. |
| 2014/0016832 A1 | 1/2014 | Kong et al. |
| 2014/0019311 A1 | 1/2014 | Tanaka |
| 2014/0025201 A1 | 1/2014 | Ryu et al. |
| 2014/0028837 A1 | 1/2014 | Gao et al. |
| 2014/0047342 A1 | 2/2014 | Breternitz et al. |
| 2014/0049616 A1 | 2/2014 | Stettner |
| 2014/0052555 A1 | 2/2014 | MacIntosh |
| 2014/0086483 A1 | 3/2014 | Zhang et al. |
| 2014/0098094 A1 | 4/2014 | Neumann et al. |
| 2014/0100813 A1 | 4/2014 | Shaowering |
| 2014/0104413 A1 | 4/2014 | McCloskey et al. |
| 2014/0129027 A1 | 5/2014 | Schnittman |
| 2014/0156133 A1 | 6/2014 | Cullinane et al. |
| 2014/0161359 A1 | 6/2014 | Magri et al. |
| 2014/0192050 A1 | 7/2014 | Qiu et al. |
| 2014/0195095 A1* | 7/2014 | Flohr ...................... G05D 1/02 701/25 |
| 2014/0195374 A1 | 7/2014 | Bassemir et al. |
| 2014/0214547 A1 | 7/2014 | Signorelli et al. |
| 2014/0214600 A1 | 7/2014 | Argue et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0279294 A1 | 9/2014 | Field-Darragh et al. |
| 2014/0300637 A1 | 10/2014 | Fan et al. |
| 2014/0316875 A1 | 10/2014 | Tkachenko et al. |

(56) References Cited

U.S. PATENT DOCUMENTS

| | | |
|---|---|---|
| 2014/0330835 A1 | 11/2014 | Boyer |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0032304 A1 | 1/2015 | Nakamura et al. |
| 2015/0039458 A1 | 2/2015 | Reid |
| 2015/0052029 A1 | 2/2015 | Wu et al. |
| 2015/0088618 A1 | 3/2015 | Basir et al. |
| 2015/0088701 A1 | 3/2015 | Desmarais et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0139010 A1 | 5/2015 | Jeong et al. |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0212521 A1 | 7/2015 | Pack et al. |
| 2015/0235157 A1 | 8/2015 | Avegliano et al. |
| 2015/0245358 A1 | 8/2015 | Schmidt |
| 2015/0262116 A1 | 9/2015 | Katircioglu et al. |
| 2015/0279035 A1 | 10/2015 | Wolski et al. |
| 2015/0298317 A1 | 10/2015 | Wang et al. |
| 2015/0310601 A1 | 10/2015 | Rodriguez et al. |
| 2015/0332368 A1 | 11/2015 | Vartiainen et al. |
| 2015/0352721 A1 | 12/2015 | Wicks et al. |
| 2015/0353280 A1* | 12/2015 | Brazeau .................. G05D 1/00 700/214 |
| 2015/0355639 A1* | 12/2015 | Versteeg ................. G06N 3/004 901/1 |
| 2015/0363625 A1 | 12/2015 | Wu et al. |
| 2015/0363758 A1 | 12/2015 | Wu et al. |
| 2015/0365660 A1 | 12/2015 | Wu et al. |
| 2015/0379704 A1 | 12/2015 | Chandrasekar et al. |
| 2016/0012588 A1 | 1/2016 | Taguchi et al. |
| 2016/0026253 A1 | 1/2016 | Bradski et al. |
| 2016/0042223 A1 | 2/2016 | Suh et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0104041 A1 | 4/2016 | Bowers et al. |
| 2016/0107690 A1 | 4/2016 | Oyama et al. |
| 2016/0112628 A1 | 4/2016 | Super et al. |
| 2016/0114488 A1 | 4/2016 | Mascorro Medina et al. |
| 2016/0129592 A1 | 5/2016 | Saboo et al. |
| 2016/0132815 A1 | 5/2016 | Itoko et al. |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171336 A1 | 6/2016 | Schwartz |
| 2016/0171429 A1 | 6/2016 | Schwartz |
| 2016/0171707 A1 | 6/2016 | Schwartz |
| 2016/0185347 A1 | 6/2016 | Lefevre et al. |
| 2016/0191759 A1 | 6/2016 | Somanath et al. |
| 2016/0224927 A1 | 8/2016 | Pettersson |
| 2016/0253735 A1 | 9/2016 | Scudillo et al. |
| 2016/0253844 A1 | 9/2016 | Petrovskaya et al. |
| 2016/0259329 A1* | 9/2016 | High .................. H04W 4/02 |
| 2016/0260054 A1 | 9/2016 | High et al. |
| 2016/0271795 A1 | 9/2016 | Vicenti |
| 2016/0313133 A1 | 10/2016 | Zeng et al. |
| 2016/0328618 A1 | 11/2016 | Patel et al. |
| 2016/0328767 A1 | 11/2016 | Bonner et al. |
| 2016/0353099 A1 | 12/2016 | Thomson et al. |
| 2016/0364634 A1 | 12/2016 | Davis et al. |
| 2017/0004649 A1 | 1/2017 | Collet Romea et al. |
| 2017/0011281 A1 | 1/2017 | Dijkman et al. |
| 2017/0011308 A1 | 1/2017 | Sun et al. |
| 2017/0032311 A1 | 2/2017 | Rizzolo et al. |
| 2017/0041553 A1 | 2/2017 | Cao et al. |
| 2017/0054965 A1 | 2/2017 | Raab et al. |
| 2017/0066459 A1 | 3/2017 | Singh |
| 2017/0074659 A1 | 3/2017 | Giurgiu et al. |
| 2017/0083774 A1 | 3/2017 | Solar et al. |
| 2017/0109940 A1 | 4/2017 | Guo et al. |
| 2017/0147966 A1 | 5/2017 | Aversa et al. |
| 2017/0150129 A1 | 5/2017 | Pangrazio |
| 2017/0178060 A1 | 6/2017 | Schwartz |
| 2017/0178227 A1 | 6/2017 | Gornish |
| 2017/0178310 A1 | 6/2017 | Gornish |
| 2017/0193434 A1 | 7/2017 | Shah et al. |
| 2017/0219338 A1 | 8/2017 | Brown et al. |
| 2017/0219353 A1 | 8/2017 | Alesiani |
| 2017/0227645 A1 | 8/2017 | Swope et al. |
| 2017/0227647 A1 | 8/2017 | Baik |
| 2017/0228885 A1 | 8/2017 | Baumgartner |
| 2017/0261993 A1 | 9/2017 | Venable et al. |
| 2017/0262724 A1 | 9/2017 | Wu et al. |
| 2017/0280125 A1 | 9/2017 | Brown et al. |
| 2017/0286773 A1 | 10/2017 | Skaff et al. |
| 2017/0286901 A1 | 10/2017 | Skaff et al. |
| 2017/0297478 A1 | 10/2017 | Sherman et al. |
| 2017/0323253 A1 | 11/2017 | Enssle et al. |
| 2017/0323376 A1 | 11/2017 | Glaser et al. |
| 2017/0337508 A1 | 11/2017 | Bogolea et al. |
| 2018/0001481 A1 | 1/2018 | Shah et al. |
| 2018/0005035 A1 | 1/2018 | Bogolea et al. |
| 2018/0005176 A1 | 1/2018 | Williams et al. |
| 2018/0020145 A1 | 1/2018 | Kotfis et al. |
| 2018/0051991 A1 | 2/2018 | Hong |
| 2018/0053091 A1 | 2/2018 | Savvides et al. |
| 2018/0053305 A1 | 2/2018 | Gu et al. |
| 2018/0075403 A1 | 3/2018 | Mascorro Medina et al. |
| 2018/0089613 A1 | 3/2018 | Chen et al. |
| 2018/0101813 A1 | 4/2018 | Paat et al. |
| 2018/0108120 A1 | 4/2018 | Venable et al. |
| 2018/0108134 A1 | 4/2018 | Venable et al. |
| 2018/0114183 A1 | 4/2018 | Howell |
| 2018/0129201 A1* | 5/2018 | Douglas ............... G05D 1/0297 |
| 2018/0130011 A1 | 5/2018 | Jacobsson |
| 2018/0136648 A1* | 5/2018 | Su ....................... G05D 1/0291 |
| 2018/0143003 A1 | 5/2018 | Clayton et al. |
| 2018/0174325 A1 | 6/2018 | Fu et al. |
| 2018/0190160 A1 | 7/2018 | Bryan et al. |
| 2018/0197139 A1 | 7/2018 | Hill |
| 2018/0201423 A1 | 7/2018 | Drzewiecki et al. |
| 2018/0204111 A1 | 7/2018 | Zadeh et al. |
| 2018/0251253 A1 | 9/2018 | Taira et al. |
| 2018/0276596 A1 | 9/2018 | Murthy et al. |
| 2018/0281191 A1 | 10/2018 | Sinyavskiy et al. |
| 2018/0293442 A1 | 10/2018 | Fridental et al. |
| 2018/0293543 A1 | 10/2018 | Tiwari et al. |
| 2018/0306958 A1 | 10/2018 | Goss et al. |
| 2018/0313956 A1 | 11/2018 | Rzeszutek et al. |
| 2018/0314260 A1 | 11/2018 | Jen et al. |
| 2018/0314908 A1 | 11/2018 | Lam |
| 2018/0315007 A1 | 11/2018 | Kingsford et al. |
| 2018/0315065 A1 | 11/2018 | Zhang et al. |
| 2018/0315173 A1 | 11/2018 | Phan et al. |
| 2018/0315865 A1 | 11/2018 | Haist et al. |
| 2018/0321692 A1 | 11/2018 | Castillo-Effen et al. |
| 2018/0370727 A1 | 12/2018 | Hance et al. |
| 2019/0049962 A1 | 2/2019 | Ouellette et al. |
| 2019/0057588 A1 | 2/2019 | Savvides et al. |
| 2019/0065861 A1 | 2/2019 | Savvides et al. |
| 2019/0073554 A1 | 3/2019 | Rzeszutek |
| 2019/0073559 A1 | 3/2019 | Rzeszutek et al. |
| 2019/0073627 A1 | 3/2019 | Nakdimon et al. |
| 2019/0077015 A1 | 3/2019 | Shibasaki et al. |
| 2019/0087663 A1 | 3/2019 | Yamazaki et al. |
| 2019/0094876 A1 | 3/2019 | Moore et al. |
| 2019/0108606 A1 | 4/2019 | Komiyama |
| 2019/0160675 A1* | 5/2019 | Paschall, II ............ G05D 1/024 |
| 2019/0178436 A1 | 6/2019 | Mao et al. |
| 2019/0180150 A1 | 6/2019 | Taylor et al. |
| 2019/0197439 A1 | 6/2019 | Wang |
| 2019/0197728 A1 | 6/2019 | Yamao |
| 2019/0236530 A1 | 8/2019 | Cantrell et al. |
| 2019/0304132 A1 | 10/2019 | Yoda et al. |

(56) References Cited

U.S. PATENT DOCUMENTS

| | | | |
|---|---|---|---|
| 2019/0310655 | A1* | 10/2019 | Voorhies ............. G06Q 50/28 |
| 2019/0392212 | A1 | 12/2019 | Sawhney et al. |
| 2020/0053325 | A1 | 2/2020 | Deyle et al. |
| 2020/0314333 | A1 | 10/2020 | Liang et al. |

FOREIGN PATENT DOCUMENTS

| | | |
|---|---|---|
| CN | 104200086 | 12/2014 |
| CN | 107067382 | 8/2017 |
| CN | 206952978 | 2/2018 |
| EP | 766098 | 4/1997 |
| EP | 1311993 | 5/2007 |
| EP | 2309378 | 4/2011 |
| EP | 2439487 | 4/2012 |
| EP | 2472475 | 7/2012 |
| EP | 2562688 | 2/2013 |
| EP | 2662831 | 11/2013 |
| EP | 2693362 | 2/2014 |
| EP | 3400113 | 11/2018 |
| GB | 2323238 | 9/1998 |
| GB | 2330265 | 4/1999 |
| JP | 2014170431 | 9/2014 |
| KR | 101234798 | 1/2009 |
| KR | 1020190031431 | 3/2019 |
| WO | WO 99/23600 | 5/1999 |
| WO | WO 2003002935 | 1/2003 |
| WO | WO 2003025805 | 3/2003 |
| WO | WO 2006136958 | 12/2006 |
| WO | WO 2007042251 | 4/2007 |
| WO | WO 2008057504 | 5/2008 |
| WO | WO 2008154611 | 12/2008 |
| WO | WO 2012103199 | 8/2012 |
| WO | WO 2012103202 | 8/2012 |
| WO | WO 2012154801 | 11/2012 |
| WO | WO 2013165674 | 11/2013 |
| WO | WO 2014066422 | 5/2014 |
| WO | WO 2014092552 | 6/2014 |
| WO | WO 2014181323 | 11/2014 |
| WO | WO 2015127503 | 9/2015 |
| WO | WO 2016020038 | 2/2016 |
| WO | WO 2017187106 | 11/2017 |
| WO | WO 2018018007 | 1/2018 |
| WO | 2018/026631 A1 | 2/2018 |
| WO | WO 2018204308 | 11/2018 |
| WO | WO 2018204342 | 11/2018 |
| WO | WO 2019023249 | 1/2019 |

OTHER PUBLICATIONS

Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).
F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.
Federico Tombari et al. "Multimodal cue integration through Hypotheses Verification for RGB-D object recognition and 6DOF pose estimation", IEEE International Conference on Robotics and Automation, Jan. 2013.
Flores, et al., "Removing Pedestrians from Google Street View Images", Computer Vision and Pattern Recognition Workshops, 2010 IEEE Computer Society Conference on, IEE, Piscataway, NJ, pp. 53-58 (Jun. 13, 2010).
Glassner, "Space Subdivision for Fast Ray Tracing." IEEE Computer Graphics and Applications, 4.10, pp. 15-24, 1984.
Golovinskiy, Aleksey, et al. "Min-Cut based segmentation of point clouds." Computer Vision Workshops (ICCV Workshops), 2009 IEEE 12th International Conference on. IEEE, 2009.
Hackel et al., "Contour Detection in unstructured 3D point clouds,"IEEE, 2016 Conference on Computer vision and Pattern recognition (CVPR), Jun. 27-30, 2016, pp. 1-9.

Hao et al., "Structure-based object detection from scene point clouds," Science Direct, v191, pp. 148-160 (2016).
Hu et al., "An improved method of discrete point cloud filtering based on complex environment," International Journal of Applied Mathematics and Statistics, v48, i18 (2013).
International Search Report and Written Opinion for International Patent Application No. PCT/US2013/070996 dated Apr. 2, 2014.
International Search Report and Written Opinion for International Patent Application No. PCT/US2013/053212 dated Dec. 1, 2014.
International Search Report and Written Opinion for corresponding International Patent Application No. PCT/US2016/064110 dated Mar. 20, 2017.
International Search Report and Written Opinion for corresponding International Patent Application No. PCT/US2017/024847 dated Jul. 7, 2017.
International Search Report and Written Opinion for International Application No. PCT/US2018/030419 dated Aug. 31, 2018.
International Search Report and Written Opinion from International Patent Application No. PCT/US2018/030345 dated Sep. 17, 2018.
International Search Report and Written Opinion from International Patent Application No. PCT/US2018/030360 dated Jul. 9, 2018.
International Search Report and Written Opinion from International Patent Application No. PCT/US2018/030363 dated Jul. 9, 2018.
International Search Report and Written Opinion for International Application No. PCT/US2019/025859 dated Jul. 3, 2019.
International Search Report and Written Opinion from International Patent Application No. PCT/US2019/025849 dated Jul. 9, 2019.
International Search Report and Written Opinion from International Patent Application No. PCT/US2019/049761 dated Nov. 15, 2019.
International Search Report and Written Opinion from International Patent Application No. PCT/US2019/051312 dated Nov. 15, 2019.
International Search Report and Written Opinion from International Patent Application No. PCT/US2019/054103 dated Jan. 6, 2020.
International Search Report and Written Opinion from International Patent Application No. PCT/US2019/064020 dated Feb. 19, 2020.
International Search Report and Written Opinion for International Patent Application No. PCT/US2020/027948 dated Jul. 16, 2020.
International Search Report and Written Opinion for International Patent Application No. PCT/US2020/028133 dated Jul. 24, 2020.
International Search Report and Written Opinion from International Patent Application No. PCT/US2020/029134 dated Jul. 27, 2020.
International Search Report and Written Opinion from International Patent Application No. PCT/US2020/028183 dated Jul. 24, 2020.
International Search Report and Written Opinion from International Patent Application No. PCT/US2020/035285 dated Aug. 27, 2020.
International Search Report and Written Opinion for International Patent Application No. PCT/US2021/024805 dated Aug. 2, 2021.
Jadhav et al. "Survey on Spatial Domain dynamic template matching technique for scanning linear barcode," International Journal of science and research v 5 n 3, Mar. 2016)(Year: 2016).
Jian Fan et al: "Shelf detection via vanishing point and radial projection", 2014 IEEE International Conference on image processing (ICIP), IEEE, (Oct. 27, 2014), pp. 1575-1578.
Kang et al., "Kinematic Path-Tracking of Mobile Robot Using Iterative learning Control", Journal of Robotic Systems, 2005, pp. 111-121.
Kay et al. "Ray Tracing Complex Scenes." ACM SIGGRAPH Computer Graphics, vol. 20, No. 4, ACM, pp. 269-278, 1986.
Kelly et al., "Reactive Nonholonomic Trajectory Generation via Parametric Optimal Control", International Journal of Robotics Research, vol. 22, No. 7-8, pp. 583-601 (Jul. 30, 2013).
Lari, Z., et al., "An adaptive approach for segmentation of 3D laser point cloud." International Archives of the Photogrammertry, Remote sensing and spatial information Sciences, vol. XXXVIII-5/W12, 2011, ISPRS Calgary 2011 Workshop, Aug. 29-31, 2011, Calgary, Canada.
Lecking et al: "Localization in a wide range of industrial environments using relative 3D ceiling features", IEEE, pp. 333-337 (Sep. 15, 2008).
Lee et al. "Statistically Optimized Sampling for Distributed Ray Tracing." ACM SIGGRAPH Computer Graphics, vol. 19, No. 3, ACM, pp. 61-67, 1985.

(56) References Cited

OTHER PUBLICATIONS

Li et al., "An improved RANSAC for 3D Point cloud plane segmentation based on normal distribution transformation cells," Remote sensing, V9: 433, pp. 1-16 (2017).

Likhachev, Maxim, and Dave Ferguson. "Planning Long dynamically feasible maneuvers for autonomous vehicles." The international journal of Robotics Reasearch 28.8 (2009): 933-945. (Year:2009).

Marder-Eppstein et al., "The Office Marathon: robust navigation in an indoor office environment," IEEE, 2010 International conference on robotics and automation, May 3-7, 2010, pp. 300-307.

McNaughton, Matthew, et al. "Motion planning for autonomous driving with a conformal spatiotemporal lattice." Robotics and Automation (ICRA), 2011 IEEE International Conference on. IEEE, 2011. (Year: 2011).

Meyersohn, "Walmart turns to robots and apps in stores", https://www.cnn.com/2018/12/07/business/walmart-robot-janitors-dotcom-store/index.html, Oct. 29, 2019.

Mitra et al., "Estimating surface normals in noisy point cloud data," International Journal of Computational geometry & applications, Jun. 8-10, 2003, pp. 322-328.

N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.

Ni et al., "Edge Detection and Feature Line Tracing in 3D-Point Clouds by Analyzing Geometric Properties of Neighborhoods," Remote Sensing, V8 19, pp. 1-20 (2016).

Norriof et al., "Experimental comparison of some classical iterative learning control algorithms", IEEE Transactions on Robotics and Automation, Jun. 2002, pp. 636-641.

Notice of allowance for U.S. Appl. No. 13/568,175 dated Sep. 23, 2014.

Notice of allowance for U.S. Appl. No. 13/693,503 dated Mar. 11, 2016.

Notice of allowance for U.S. Appl. No. 14/068,495 dated Apr. 25, 2016.

Notice of allowance for U.S. Appl. No. 14/518,091 dated Apr. 12, 2017.

"Fair Billing with Automatic Dimensioning" pp. 1-4, undated, Copyright Mettler-Toledo International Inc.

"Plane Detection in Point Cloud Data" dated Jan. 25, 2010 by Michael Ying Yang and Wolfgang Forstner, Technical Report 1, 2010, University of Bonn.

"Swift Dimension" Trademark Omniplanar, Copyright 2014.

Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.

Batalin et al., "Mobile robot navigation using a sensor network," IEEE, International Conference on robotics and automation, Apr. 26, May 1, 2004, pp. 636-641.

Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.

Biswas et al. "Depth Camera Based Indoor Mobile Robot Localization and Navigation" Robotics and Automation (ICRA), 2012 IEEE International Conference on IEEE, 2012.

Bohm, Multi-Image Fusion for Occlusion-Free Façade Texturing, International Archives of the Photogrammetry, Remote Sensing and Spatial Information Sciences, pp. 867-872 (Jan. 2004).

Bristow et al., "A Survey of Iterative Learning Control", IEEE Control Systems, Jun. 2006, pp. 96-114.

Buenaposada et al. "Realtime tracking and estimation of plane pose" Proceedings of the ICPR (Aug. 2002) vol. II, IEEE pp. 697-700.

Carreira et al., "Enhanced PCA-based localization using depth maps with missing data," IEEE, pp. 1-8, Apr. 24, 2013.

Castorena et al., "Autocalibration of lidar and optical cameras via edge alignment", 2016 IEEE International Conference on Acoustics, Speech and Signal Processing (Mar. 20, 2016).

Chen et al. "Improving Octree-Based Occupancy Maps Using Environment Sparsity with Application to Aerial Robot Navigation" Robotics and Automation (ICRA), 2017 IEEE.

Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).

Cook et al., "Distributed Ray Tracing" ACM SIGGRAPH Computer Graphics, vol. 18, No. 3, ACM pp. 137-145, 1984.

Datta, A., et al. "Accurate camera calibration using iterative refinement of control points," in Computer Vision Workshops (ICCV Workshops), 2009.

Deschaud, et al., "A Fast and Accurate Place Detection algoritm for large noisy point clouds using filtered normals and voxel growing," 3DPVT, May 2010, Paris, France. [hal-01097361].

Douillard, Bertrand, et al. "On the segmentation of 3D LIDAR point clouds." Robotics and Automation (ICRA), 2011 IEEE International Conference on IEEE, 2011.

Notice of allowance for U.S. Appl. No. 15/211,103 dated Apr. 5, 2017.

Olson, Clark F., et al. "Wide-Baseline Stereo Vision for terrain Mapping" in Machine Vision and Applications, Aug. 2010.

Oriolo et al., "An iterative learning controller for nonholonomic mobile Robots", the international Journal of Robotics Research, Aug. 1997, pp. 954-970.

Ostafew et al., "Visual Teach and Repeat, Repeat, Repeat: Iterative learning control to improve mobile robot path tracking in challenging outdoor environment", IEEE/RSJ International Conference on Intelligent robots and Systems, Nov. 2013, p. 176-.

Park et al., "Autonomous mobile robot navigation using passive rfid in indoor environment," IEEE, Transactions on industrial electronics, vol. 56, issue 7, pp. 2366-2373 (Jul. 2009).

Perveen et al. (An overview of template matching methodologies and its application, International Journal of Research in Computer and Communication Technology, v2n10, Oct. 2013) (Year: 2013).

Pivtoraiko et al., "Differentially constrained mobile robot motion planning in state lattices", journal of field robotics, vol. 26, No. 3, 2009, pp. 308-333.

Pratt W K Ed: "Digital Image processing, 10-image enhancement, 17-image segmentation", Jan. 1, 2001, Digital Image Processing: PIKS Inside, New York: John Wily & Sons, US, pp. 243-258, 551.

Puwein, J., et al. "Robust Multi-view camera calibration for wide-baseline camera networks, "in IEEE Workshop on Applications of computer vision (WACV), Jan. 2011.

Rusu, et al. "How to incrementally register pairs of clouds," PCL Library, retrieved from internet on Aug. 22, 2016 [http://pointclouds.org/documentation/tutorials/pairwise_incremental_registration.php.

Rusu, et al. "Spatial Change detection on unorganized point cloud data," PCL Library, retrieved from internet on Aug. 19, 2016 [http://pointclouds.org/documentation/tutorials/octree_change.php].

Schnabel et al. "Efficient RANSAC for Point-Cloud Shape Detection", vol. 0, No. 0, pp. 1-12 (1981).

Senthilkumaran, et al., "Edge Detection Techniques for Image Segmentation—A Survey of Soft Computing Approaches", International Journal of Recent Trends in Engineering, vol. 1, No. 2 (May 2009).

Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].

Tahir, Rabbani, et al., "Segmentation of point clouds using smoothness constraint, "International Archives of Photogrammetry, Remote Sensing and Spatial Information Sciences 36.5 (Sep. 2006): 248-253.

Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=rep1&type=p.

Tseng, et al., "A Cloud Removal Approach for Aerial Image Visualization", International Journal of Innovative Computing, Information & Control, vol. 9, No. 6, pp. 2421-2440 (Jun. 2013).

(56) References Cited

OTHER PUBLICATIONS

Uchiyama, et al., "Removal of Moving Objects from a Street-View Image by Fusing Multiple Image Sequences", Pattern Recognition, 2010, 20th International Conference on, IEEE, Piscataway, NJ pp. 3456-3459 (Aug. 23, 2010).
United Kingdom Intellectual Property Office, "Combined Search and Examination Report" for GB Patent Application No. 1813580.6 dated Feb. 21, 2019.
United Kingdom Intellectual Property Office, Combined Search and Examination Report dated Jan. 22, 2016 for GB Patent Application No. 1417218.3.
United Kingdom Intellectual Property Office, Combined Search and Examination Report dated Jan. 22, 2016 for GB Patent Application No. 1521272.3.
United Kingdom Intellectual Property Office, Combined Search and Examination Report dated Mar. 11, 2015 for GB Patent Application No. 1417218.3.
United Kingdom Intellectual Property Office, Combined Search and Examination Report dated May 13, 2020 for GB Patent Application No. 1917864.9.
Varol Gul et al: "Product placement detection based on image processing", 2014 22nd Signal Processing and Communication Applications Conference (SIU), IEEE, Apr. 23, 2014.
Varol Gul et al: "Toward Retail product recognition on Grocery shelves", Visual Communications and image processing; Jan. 20, 2004; San Jose, (Mar. 4, 2015).
Weber et al., "Methods for Feature Detection in Point clouds," visualization of large and unstructured data sets—IRTG Workshop, pp. 90-99 (2010).
Zhao Zhou et al.: "An Image contrast Enhancement Algorithm Using PLIP-based histogram Modification", 2017 3rd IEEE International Conference on Cybernetics (CYBCON), IEEE, (Jun. 21, 2017).
Ziang Xie et al., "Multimodal Blending for High-Accuracy Instance Recognition", 2013 IEEE RSJ International Conference on Intelligent Robots and Systems, p. 2214-2221.
Fan Zhang et al., "Parallax-tolerant Image Stitching", 2014 Computer Vision Foundation, pp. 4321-4328.
Kaimo Lin et al., "Seagull: Seam-guided Local Alignment for Parallax-tolerant Image Stitching", Retrieved on Nov. 16, 2020 [http://publish.illinois.edu/visual-modeling-and-analytics/files/2016/08/Seagull.pdf].
Julio Zaragoza et al., "As-Projective-As-Possible Image Stitching with Moving DLT", 2013 Computer Vision Foundation, pp. 2339-2346.
Zeng et al., Multi-view Self Supervised Deep Learning for 6D Pose Estimation in the Amazon Picking Challenge, May 7, 2017. Retrieved on Nov. 16, 2019 [https://arxiv.org/pdf/1609.09475.pdf].
United Kingdom Intellectual Property Office, Examination Report dated Feb. 2, 2023 for GB Patent Application No. 2117122.8.
Canadian Intellectual Property Office, Examination Report dated Dec. 15, 2022 for Canadian Patent Application No. 3135764.
Australian Government, IP Australia, Examination Report dated Jan. 30, 2023 for Australian Application No. 2020289521.

* cited by examiner

METHOD, SYSTEM AND APPARATUS FOR DYNAMIC TASK SEQUENCING

BACKGROUND

Environments in which objects are managed, such as retail facilities, warehousing and distribution facilities, and the like, may be complex and fluid. For example, a retail facility may include objects such as products for purchase, and a distribution facility may include objects such as parcels or pallets. Each facility may also contain dynamic obstacles such as people, vehicles and the like. A mobile apparatus may be deployed within such facilities to perform tasks at various locations. For example, a mobile apparatus may be deployed to capture data at various locations in a retail facility. Determining a path for the mobile apparatus to travel efficiently among the above-mentioned locations, however, may be computationally intensive.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
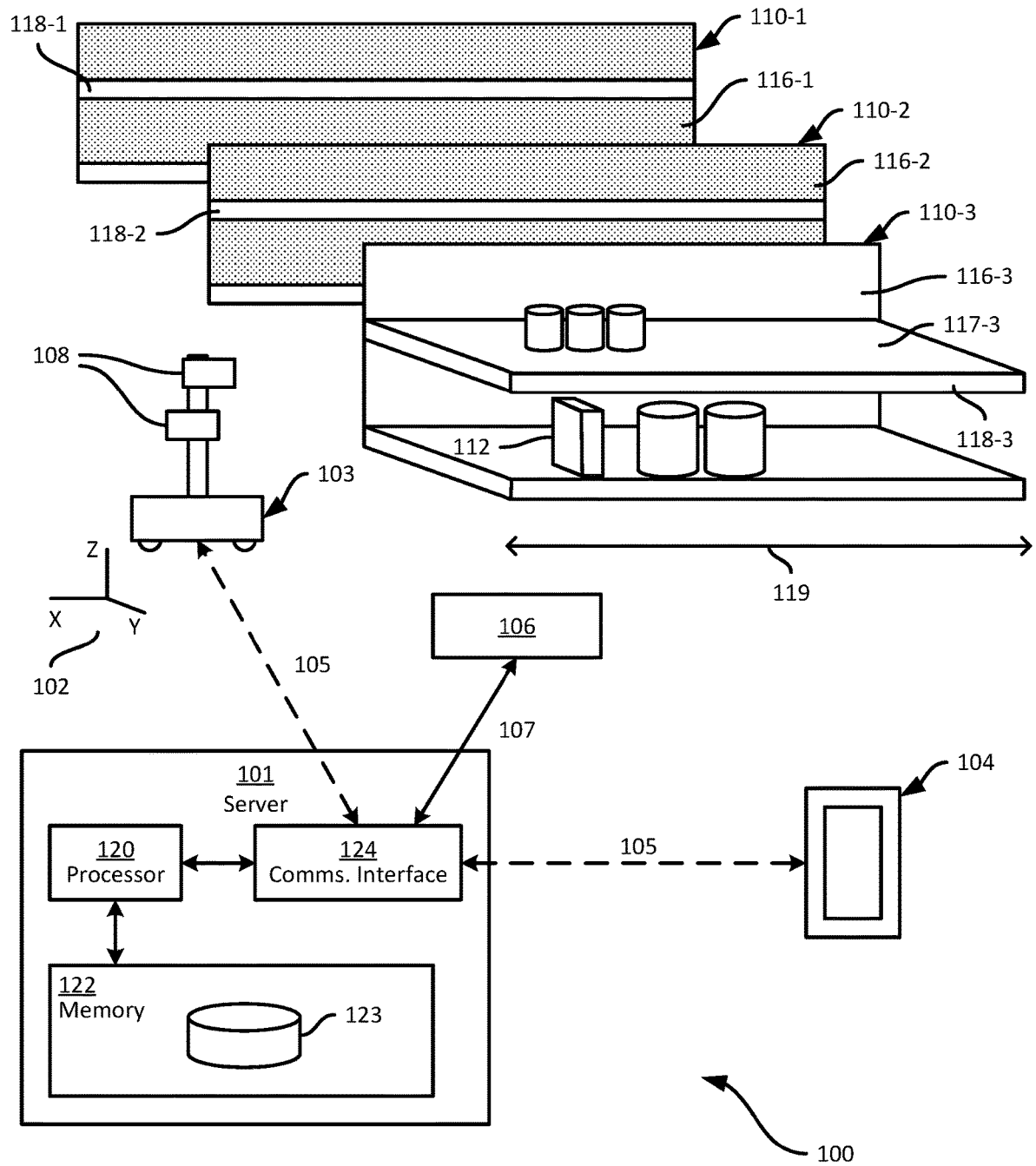
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method in a navigational controller, including: obtaining (i) a plurality of task fragments identifying respective sets of sub-regions in a facility, and (ii) an identifier of a task to be performed by a mobile automation apparatus at each of the sets of sub-regions; selecting an active one of the task fragments according to a sequence specifying an order of execution of the task fragments; generating a path including (i) a taxi portion from a current position of the mobile automation apparatus to the sub-regions identified by the active task fragment, and (ii) an execution portion traversing the sub-regions identified by the active task fragment; during travel along the taxi portion, determining, based on a current pose of the mobile automation apparatus, whether to initiate execution of another task fragment; and when the determination is affirmative, updating the sequence to mark the other task fragment as the active task fragment.

Additional examples disclosed herein are directed to a mobile automation apparatus, comprising: a locomotive assembly; a data capture sensor; and a navigational controller configured to: obtain (i) a plurality of task fragments identifying respective sets of sub-regions in a facility, and (ii) an identifier of a task to be performed at each of the sets of sub-regions; select an active one of the task fragments according to a sequence specifying an order of execution of the task fragments; generate a path including (i) a taxi portion from a current position of the mobile automation apparatus to the sub-regions identified by the active task fragment, and (ii) an execution portion traversing the sub-regions identified by the active task fragment; control the locomotive assembly to travel along the path; during travel along the taxi portion, determine, based on a current pose of the mobile automation apparatus, whether to initiate execution of another task fragment; and when the determination is affirmative, update the sequence to mark the other task fragment as the active task fragment.

Further examples disclosed herein are directed to a method in a navigational controller comprising: obtaining a sequence of task fragments identifying respective sets of sub-regions in a facility; selecting an active one of the task fragments according to the sequence; controlling a mobile automation apparatus to perform a task at the set of sub-regions identified by the active task fragment; responsive to a change in a pose of the mobile automation apparatus during performance of the task, updating the sequence to mark another task fragment as the active task fragment.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one client computing device 104 via communication links 105, illustrated in the present example as including wireless links. In the present example, the links 105 are provided by a wireless local area network (WLAN) deployed via one or more access points (not shown). In other examples, the server 101, the client device 104, or both, are located remotely (i.e. outside the environment in which the apparatus 103 is deployed), and the links 105 therefore include wide-area networks such as the Internet, mobile networks, and the like. The system 100 also includes a dock 106 for the apparatus 103 in the present example. The dock 106 is in communication with the server 101 via a link 107 that in the present example is a wired link. In other examples, however, the link 107 is a wireless link.

The client computing device 104 is illustrated in FIG. 1 as a mobile computing device, such as a tablet, smart phone or the like. In other examples, the client device 104 is implemented as another type of computing device, such as a desktop computer, a laptop computer, another server, a kiosk, a monitor, and the like. The system 100 can include a plurality of client devices 104 in communication with the server 101 via respective links 105.

The system 100 is deployed, in the illustrated example, in a retail facility including a plurality of support structures such as shelf modules 110-1, 110-2, 110-3 and so on (collectively referred to as shelf modules 110 or shelves 110, and generically referred to as a shelf module 110 or shelf 110—this nomenclature is also employed for other elements discussed herein). Each shelf module 110 supports a plurality of products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3.

The shelf modules 110 are typically arranged in a plurality of aisles, each of which includes a plurality of modules 110 aligned end-to-end. In such arrangements, the shelf edges 118 face into the aisles, through which customers in the retail facility as well as the apparatus 103 may travel. As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to each of the support surface 117-3 and the underside (not shown) of the support surface 117-3. In other examples, the angles between the shelf edge 118-3 and the adjacent surfaces, such as the support surface 117-3, is more or less than ninety degrees.

The apparatus 103 is equipped with a plurality of navigation and data capture sensors 108, such as image sensors (e.g. one or more digital cameras) and depth sensors (e.g. one or more Light Detection and Ranging (LIDAR) sensors, one or more depth cameras employing structured light patterns, such as infrared light, or the like). The apparatus 103 is deployed within the retail facility and, via communication with the server 101 and use of the sensors 108, navigates autonomously or partially autonomously along a length 119 of at least a portion of the shelves 110. Navigation may be performed according to a frame of reference 102 established within the retail facility. That is, the apparatus 103 tracks its location in the frame of reference 102.

While navigating among the shelves 110, the apparatus 103 can capture images, depth measurements and the like, representing the shelves 110 (generally referred to as shelf data or captured data). As will be discussed in greater detail below, the apparatus 103 receives instructions (e.g. from the server 101) to perform a task such as the above-mentioned data collection with respect to a plurality of shelf modules 110. In addition to navigating among the shelves 110 to perform the specified task, the apparatus 103 can also determine and update a sequence in which the shelf modules 110 are traversed for data capture. Determining and updating the sequence enables the apparatus 103 to traverse the shelf modules 110 in an order that favors travel time spent conducting data capture over travel time spent taxiing (i.e. travelling without capturing data).

The server 101 includes a special purpose controller, such as a processor 120, specifically designed to control and/or assist the mobile automation apparatus 103 to navigate the environment and to capture data. The processor 120 is interconnected with a non-transitory computer readable storage medium, such as a memory 122, having stored thereon computer readable instructions for performing various functionality, including control of the apparatus 103 to navigate the modules 110 and capture shelf data, as well as post-processing of the shelf data. The memory 122 can also store data for use in the above-mentioned control of the apparatus 103, such as a repository 123 containing a map of the retail environment and any other suitable data (e.g. operational constraints used to control the apparatus 103, data captured by the apparatus 103, and the like).

The memory 122 includes a combination of volatile memory (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In some embodiments, the processor 120 is implemented as one or more central processing units (CPUs) and/or graphics processing units (GPUs).

The server 101 also includes a communications interface 124 interconnected with the processor 120. The communications interface 124 includes suitable hardware (e.g. transmitters, receivers, network interface controllers and the like) allowing the server 101 to communicate with other computing devices—particularly the apparatus 103, the client device 104 and the dock 106—via the links 105 and 107. The links 105 and 107 may be direct links, or links that traverse one or more networks, including both local and wide-area networks. The specific components of the communications interface 124 are selected based on the type of network or other links that the server 101 is required to communicate over. In the present example, as noted earlier, a wireless local-area network is implemented within the retail facility via the deployment of one or more wireless access points. The links 105 therefore include either or both wireless links between the apparatus 103 and the mobile device 104 and the above-mentioned access points, and a wired link (e.g. an Ethernet-based link) between the server 101 and the access point.

The processor 120 can therefore obtain data captured by the apparatus 103 via the communications interface 124 for storage (e.g. in the repository 123) and subsequent processing (e.g. to detect objects such as shelved products in the captured data, and detect status information corresponding to the objects). The server 101 may also transmit status notifications (e.g. notifications indicating that products are out-of-stock, in low stock or misplaced) to the client device 104 responsive to the determination of product status data. The client device 104 includes one or more controllers (e.g. central processing units (CPUs) and/or field-programmable gate arrays (FPGAs) and the like) configured to process (e.g. to display) notifications received from the server 101.

Figure 2:
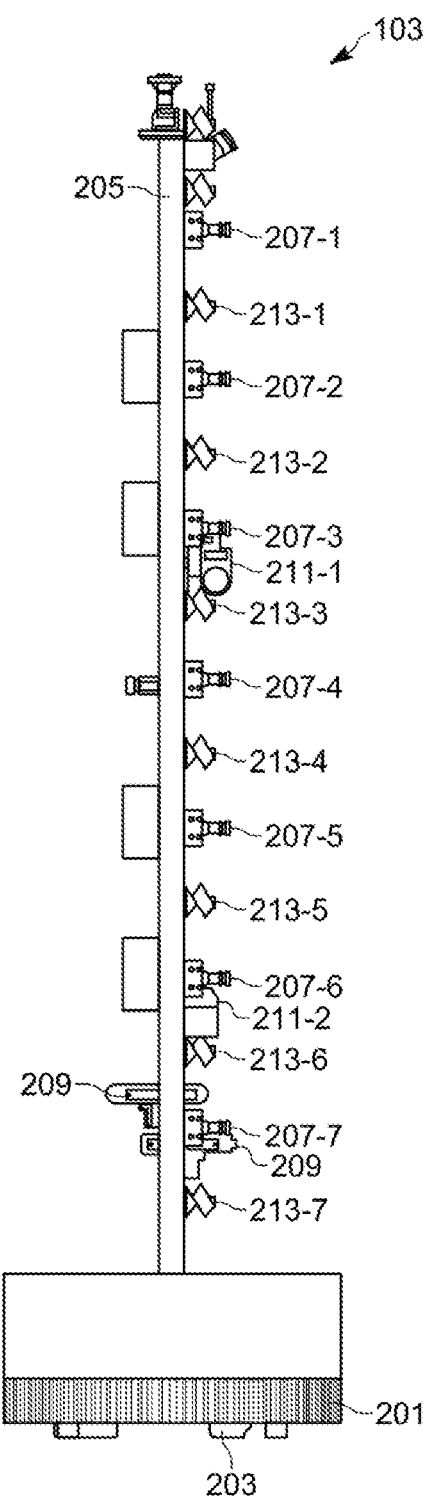
FIG. 2 depicts a mobile automation apparatus in the system of FIG. 1.

Turning now to FIG. 2, the mobile automation apparatus 103 is shown in greater detail. The apparatus 103 includes a chassis 201 containing a locomotive mechanism 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 108 mentioned earlier. In particular, the sensors 108 include at least one imaging sensor 207, such as a digital camera, as well as at least one depth sensor 209, such as a 3D digital camera capable of capturing both depth data and image data. The apparatus 103 also includes additional depth sensors, such as LIDAR sensors 211. As shown in FIG. 2, the cameras 207 and the LIDAR sensors 211 are arranged on one side of the mast 205, while the depth sensor 209 is arranged on a front of the mast 205. That is, the depth sensor 209 is forward-facing (i.e. captures data in the direction of travel of the apparatus 103), while the cameras 207 and LIDAR sensors 211 are side-facing (i.e. capture data alongside the apparatus 103, in a direction perpendicular to the direction of travel). In other examples, the apparatus 103 includes additional sensors, such as one or more RFID readers, temperature sensors, and the like.

In the present example, the mast 205 supports seven digital cameras 207-1 through 207-7, and two LIDAR sensors 211-1 and 211-2. The mast 205 also supports a plurality of illumination assemblies 213, configured to illuminate the fields of view of the respective cameras 207. That is, the illumination assembly 213-1 illuminates the field of view of the camera 207-1, and so on. The sensors 207 and 211 are oriented on the mast 205 such that the fields of view of each sensor face a shelf 110 along the length 119 of which the apparatus 103 is traveling. The apparatus 103 is configured to track a location of the apparatus 103 (e.g. a location of the center of the chassis 201) in a common frame of reference previously established in the retail facility, permitting data captured by the mobile automation apparatus to be registered to the frame of reference.

Figure 3:
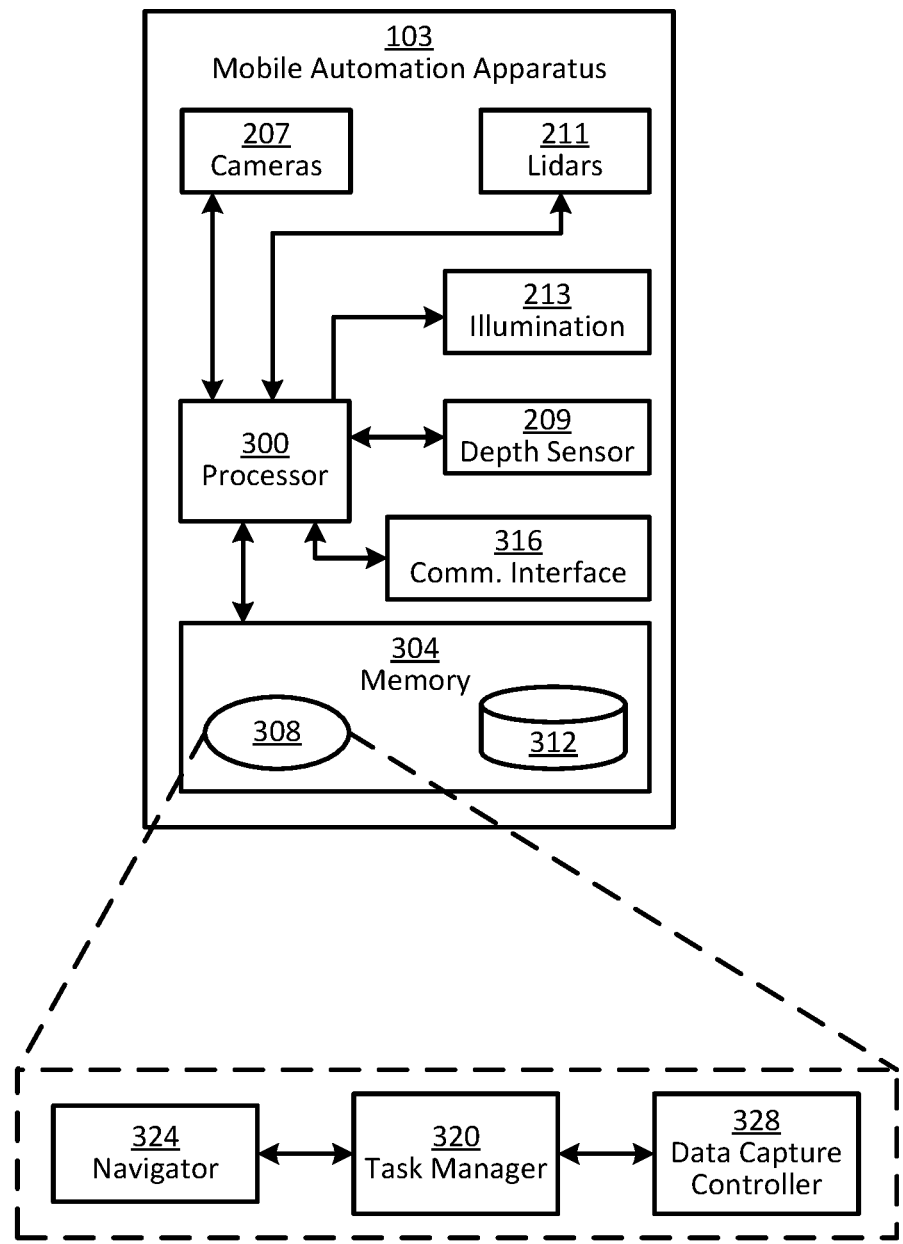
FIG. 3 is a block diagram of certain internal components of the mobile automation apparatus in the system of FIG. 1.

Referring to FIG. 3, certain components of the mobile automation apparatus 103 are shown, in addition to the cameras 207, depth sensor 209, lidars 211, and illumination assemblies 213 mentioned above. The apparatus 103 includes a special-purpose controller, such as a processor 300, interconnected with a non-transitory computer readable storage medium, such as a memory 304. The memory 304 includes a suitable combination of volatile memory (e.g. Random Access Memory or RAM) and non-volatile memory (e.g. read only memory or ROM, Electrically Erasable Programmable Read Only Memory or EEPROM, flash memory). The processor 300 and the memory 304 each comprise one or more integrated circuits. The memory 304 stores computer readable instructions for execution by the processor 300. In particular, the memory 304 stores a navigational application 308 which, when executed by the processor 300, configures the processor 300 to perform various functions discussed below in greater detail and related to the navigation of the apparatus 103 (e.g. by controlling the locomotive mechanism 203). The processor 300, when so configured by the execution of the application 308, may also be referred to as a navigational controller 300. Those skilled in the art will appreciate that the functionality implemented by the processor 300 via the execution of the application 308 may also be implemented by one or more specially designed hardware and firmware components, such as FPGAs, ASICs and the like in other embodiments.

The memory 304 may also store a repository 312 containing, for example, a map of the environment in which the apparatus 103 operates, for use during the execution of the application 308. The apparatus 103 also includes a communications interface 316 enabling the apparatus 103 to communicate with the server 101 (e.g. via the link 105 or via the dock 106 and the link 107), for example to receive instructions to navigate to specified locations and initiate data capture operations.

FIG. 3 also illustrates example components of the application 308. As will be apparent to those skilled in the art, the illustrated components may be implemented as a suite of distinct applications in other embodiments. In the present example, the application 308 includes a task manager 320 configured to receive the instructions from the server 101 defining tasks to be performed by the apparatus 103. The instructions include task fragments, each identifying a task (e.g. a data capture task) and a set of sub-regions in the facility. In the present example, the sub-regions correspond to shelf modules 110. Further, the task fragments typically identify contiguous sets of modules 110. The task manager 320, in general, controls the other components of the application 308 to execute the task fragments according to a sequence that may be updated dynamically under certain conditions.

The other components of the application 308 include a navigator 324 that determines an initial sequence for the above-mentioned task fragments (e.g. for returning to the task manager 320). The navigator 324 also receives instructions from the task manager 320 to execute task fragments, and generates paths (for example, based on the map stored in the repository 312) through the retail facility traversing the shelf modules 110 identified by each task fragment. The navigator 324 further controls the locomotive mechanism 203 to travel along the above-mentioned paths.

The application 308 includes a data capture controller 328 that receives instructions from the task manager 320 to execute task fragments, and controls the sensors 108 (e.g. the image sensors 207 and the depth sensors 209) to capture data such as images of the shelf modules 110 while the apparatus 103 travels along the paths under the action of the navigator 324.

The above-mentioned paths include taxi portions, which are portions of the paths that the apparatus 103 travels along without performing tasks (e.g. data capture), and execution portions, which are portions of the paths that traverse modules 110 where the specified task is to be performed. For example, for a data capture task relating to a particular region (also referred to as an aisle, e.g. a set of contiguous shelf modules 110), the apparatus 103 may travel along a taxi portion of a path to arrive at an end of the aisle, and then along an execution portion that traverses the aisle while performing the data capture task. The dynamic updating of the sequence of task fragments noted above is performed by the task manager 320 to reduce the length of the taxi portions (i.e. to reduce the time spent traveling by the apparatus 103 during which the specified task is not being performed).

Figure 4:
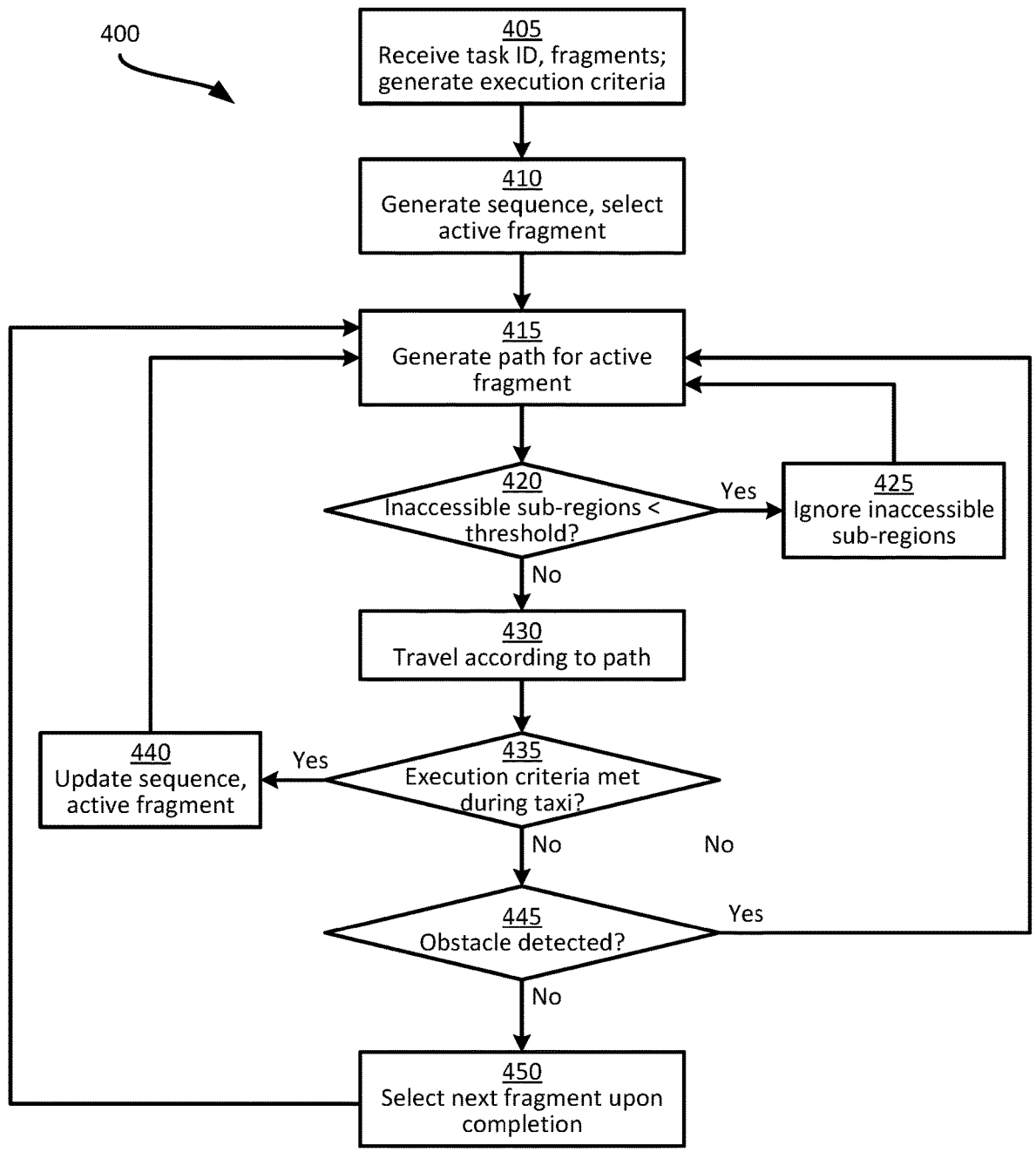
FIG. 4 is a flowchart of a task sequencing method in the system of FIG. 1.

The functionality of the application 308 to dynamically update the sequence in which task fragments are executed by the apparatus 103 will now be described in greater detail, with reference to FIG. 4. FIG. 4 illustrates a method 400 of dynamic task sequencing, which will be described in conjunction with its performance in the system 100, and in particular by the apparatus 103, with reference to the components illustrated in FIGS. 2 and 3. As will be apparent in the discussion below, in other examples, some or all of the processing performed by the server 101 may be performed by the apparatus 103, and some or all of the processing performed by the apparatus 103 may be performed by the server 101.

At block 405, the apparatus 103, and in particular the task manager 320, receives a plurality of task fragments and a task identifier. The task fragments and the task identifier may be received, for example, from the server 101 via the communications interface 316. The task fragments received at block 405 each include a set of sub-region identifiers. More specifically, in the present example each task fragment identifies a set of contiguous shelf modules 110, and the task identifier indicates a task to be performed by the apparatus 103 with respect to the identified shelf modules 110.

Figure 5:
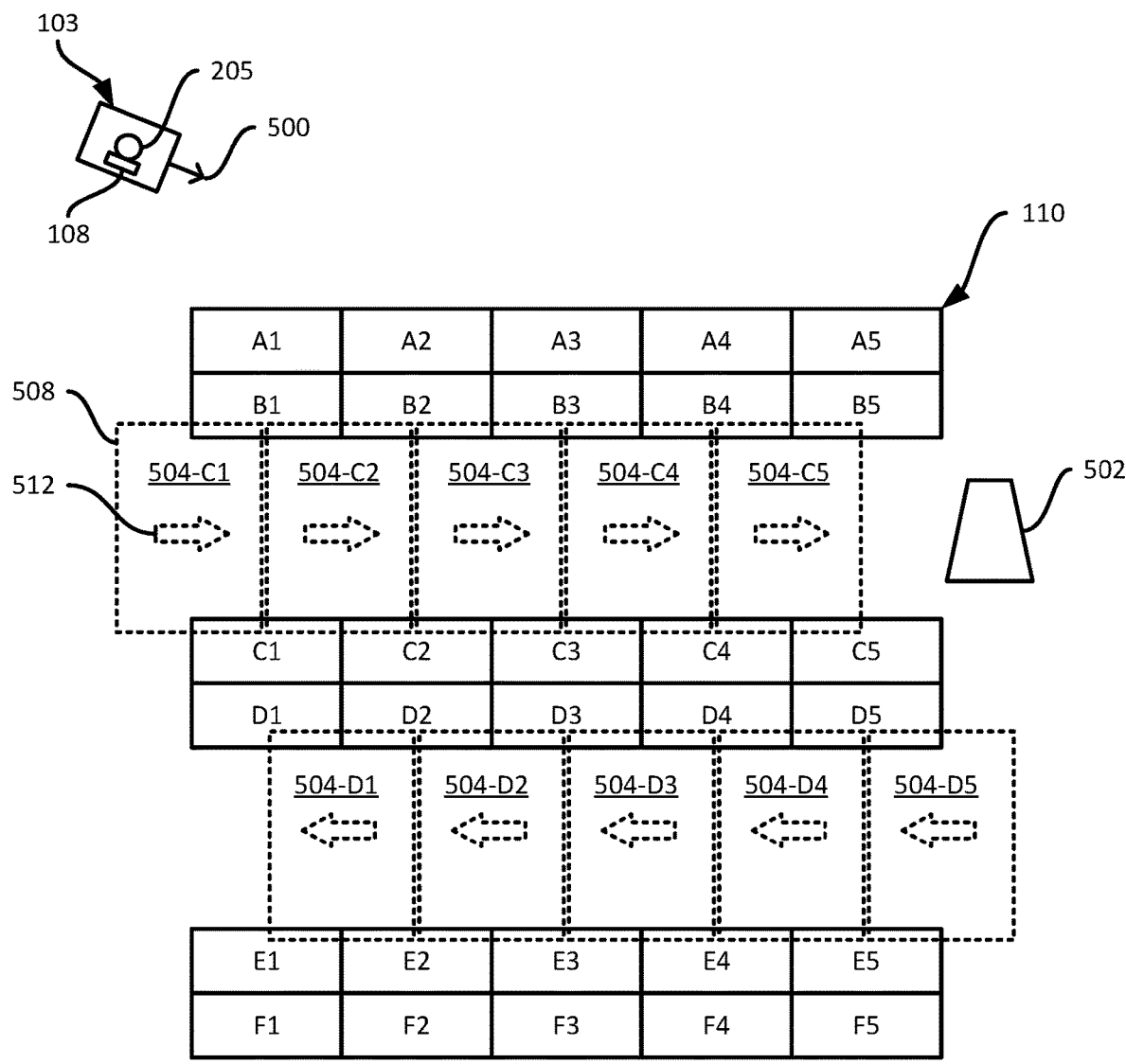
FIG. 5 is a diagram of a retail facility illustrating the generation of execution criteria at block 405 of the method of FIG. 4.

FIG. 5 illustrates an example retail facility including a plurality of shelf modules 110, referred to by alphanumeric identifiers for ease of reference in the discussion below. In particular, six sets of contiguous modules 110 are shown, namely A1-A5, B1-B5, C1-C5, D1-D5, E1-E5 and F1-F5. A current position of the apparatus 103 is also shown, and a current heading direction 500 the apparatus 103 is also illustrated. As will be apparent to those skilled in the art, the location and heading 500 of the apparatus 103 constitute the pose of the apparatus 103. Also shown in FIG. 5 is an obstacle 502 at the end of the aisle containing the "B" and "C" modules. The obstacle 502 can be a dynamic obstacle not represented in the map stored in the repository 312, such as a person, or a fixed obstacle such as a pillar (which may be represented in the map stored in the repository 312).

Table 1 contains example task data received at the apparatus 103 from the server 101 in an example performance of block 405, defining task fragments to be performed by the apparatus 103 in the retail facility shown in FIG. 5. Although the task fragments are shown in a tabular format for ease of illustration, it will be apparent to those skilled in the art that the task fragments and the task identifier can be provided to the apparatus in any of a wide variety of suitable formats.

Table 1 contains a task identifier, indicating that the apparatus 103 is to perform a data capture task with respect to each of the task fragments. In other examples, a plurality of task identifiers may be provided to the apparatus 103, for example specifying different tasks for different task fragments. Table 1 also contains task fragments identifying certain sets of the modules 110 shown in FIG. 5. Specifically, Table 1 lists five task fragments, corresponding respectively to the "A", "B", "C", "D" and "E" modules shown in FIG. 5 (Table 1 does not contain a task fragment corresponding to the "F" modules of FIG. 5).

TABLE 1

Example Task Fragments

| Task ID | Fragment ID | Module ID(s) |
| --- | --- | --- |
| Data Capture | A | A1, A2, A3, A4, A5 |
| | B | B1, B2, B3, B4, B5 |
| | C | C1, C2, C3, C4, C5 |
| | D | D1, D2, D3, D4, D5 |
| | E | E1, E2, E3, E4, E5 |

As seen above, each task fragment can include a fragment identifier (which may be omitted in other embodiments), and identifiers of each module to which the fragment relates. The module identifiers enable the apparatus 103 (e.g. the navigator 324) to retrieve locations for the corresponding modules from a map in the repository 312.

Responsive to receiving the task fragments, the task manager 320 stores the task fragments in the memory 304, and also generates execution criteria corresponding to each module identified in the task fragments. As will be discussed in greater detail below, while the apparatus 103 is taxiing, the task manager monitors the current pose (i.e. location and direction 500) of the apparatus 103. When the current pose of the apparatus 103 satisfies the execution criteria corresponding to a given module, the task manager 320 updates the sequence of task fragments to initiate the performance of the specified task for that module. In other words, the task manager 320 interrupts taxiing of the apparatus 103 to begin task execution when the current pose of the apparatus 103 satisfies any of the execution criteria.

The execution criteria for a given module therefore represent physical constraints that are satisfied when the apparatus 103 is in a position favorable to the performance of the task for that module. In the present example, the execution criteria for each module define a proximity criterion and a direction criterion. The proximity criterion defines an area of the facility adjacent to the relevant module, and the direction criterion defines a direction of travel. When the current pose of the apparatus 103 indicates that the apparatus 103 is inside the area defined by the proximity criterion, and is traveling in a direction matching the direction criterion (e.g. within a certain angular threshold), the execution criteria are satisfied.

FIG. 5 illustrates execution criteria 504 for the "C" and "D" modules, superimposed on the facility. The task manager 320 generates execution criteria for every module identified in the task fragments, but criteria 504 are illustrated only for the "C" and "D" modules to preserve legibility, as many of the criteria overlap spatially. Specifically, FIG. 5 illustrates execution criteria 504-C1 through 504-05 for the "C" modules, and execution criteria 504-D1 through 504-D5 for the "D" modules. As illustrated, each execution criterion defines an area 508 within the facility, and a direction 512. The areas 508 can be defined by coordinates, such as a set of four coordinates in the frame of reference 102. Although the areas 508 are shown as rectangular areas in FIG. 5, the areas 508 can also have various other shapes. As will be apparent from FIG. 5, each area 508 is adjacent to at least a portion of the corresponding module. That is, the are 508 of the criteria 504-C1 is adjacent to the module C1 to which the criteria 504-C1 corresponds.

The direction 512 of each of the execution criteria 504 indicates a direction of travel required for the apparatus 103 to perform the data capture task with respect to the corresponding module. The mast 205 and the sensors 108 are fixed to the chassis 201 of the apparatus 103, and therefore the apparatus 103, as shown in the illustrated examples, is required to travel with the target module on the right (i.e. starboard) side of the chassis 201. Therefore, the directions 512 of the execution criteria 504-C1 to 504-C5 are opposite to the directions 512 of the execution criteria 504-D1 to 504-D5.

As will now be apparent, if the apparatus 103 taxis into the region 508 while traveling in the direction 512 (or within a configurable angular threshold of the direction 512) of the execution criteria 504-C1, then the execution criteria 504-C1 are satisfied. The task manager 320, according to a mechanism discussed below, will therefore initiate performance of the data capture task with respect to the module C1, instead of another module towards which the apparatus 103 was taxiing.

Returning to FIG. 4, having received the task identifier and task fragments, and having generated and stored the execution criteria, the apparatus 103 generates a sequence for the task fragments. In the present example, the navigator 324 retrieves the locations of the sub-regions (i.e. modules 110) identified in the task fragments from the map stored in the repository 312. The navigator 324 also retrieves the current location of the apparatus 103 itself in the common frame of reference 102. Based on the locations of the modules 110 identified by the task fragments (e.g., the locations of the end-points of each task fragment, such as the location of the modules A1 and A5 for the task fragment A) and the current location of the apparatus 103, the navigator 324 generates the sequence to optimize the distance that the apparatus 103 must travel to complete the task fragments. That is, the navigator 324 sequences the task fragments to reduce the total distance travelled in the execution of the task fragments, according to a suitable path optimization process.

Responsive to generating the sequence, the navigator 324 returns the sequence to the task manager 320. Table 2 contains an example sequence returned to the task manager 320 by the navigator 324.

TABLE 2

Example Task Fragment Sequence

| Fragment ID | Module ID | Status |
|---|---|---|
| A | A1 | Active |
|   | A2 |   |
|   | A3 |   |
|   | A4 |   |
|   | A5 |   |
| B | B5 |   |
|   | B4 |   |
|   | B3 |   |
|   | B2 |   |
|   | B1 |   |
| C | C1 |   |
|   | C2 |   |
|   | C3 |   |
|   | C4 |   |
|   | C5 |   |
| D | D5 |   |
|   | D4 |   |
|   | D3 |   |
|   | D2 |   |
|   | D1 |   |
| E | E1 |   |
|   | E2 |   |
|   | E3 |   |
|   | E4 |   |
|   | E5 |   |

As seen above, the sequence generated by the navigator 324 defines an order in which the apparatus 103 will perform the task fragments shown in Table 1. The sequence may specify, as in the illustrated embodiment, not only the order of the task fragments, but also the order of the modules identified by each task fragment. Thus, Table 2 defines a sequence in which the apparatus 103 will first traverse the "A" modules beginning at the module A1 and ending at the module A5. The apparatus 103 will then traverse the "B" modules beginning at the module B5 and ending at the module B1, and so on until the module E5 is reached. As will be apparent from FIG. 5, the order specified for the task fragments (and the modules identified therein) minimizes taxiing between task fragments.

At block 410, the task manager 320 selects an active task fragment according to the sequence. The active task fragment selected is the task fragment nearest the beginning of the sequence that has not yet been completed. Therefore, in the present example, the task fragment A is selected at block 410. The task manager 320 can store an indication of which task fragment is active, as shown in Table 2. The task manager 320 can also, in some examples, store an indication of which module of the active task fragment is currently active.

Figure 6:
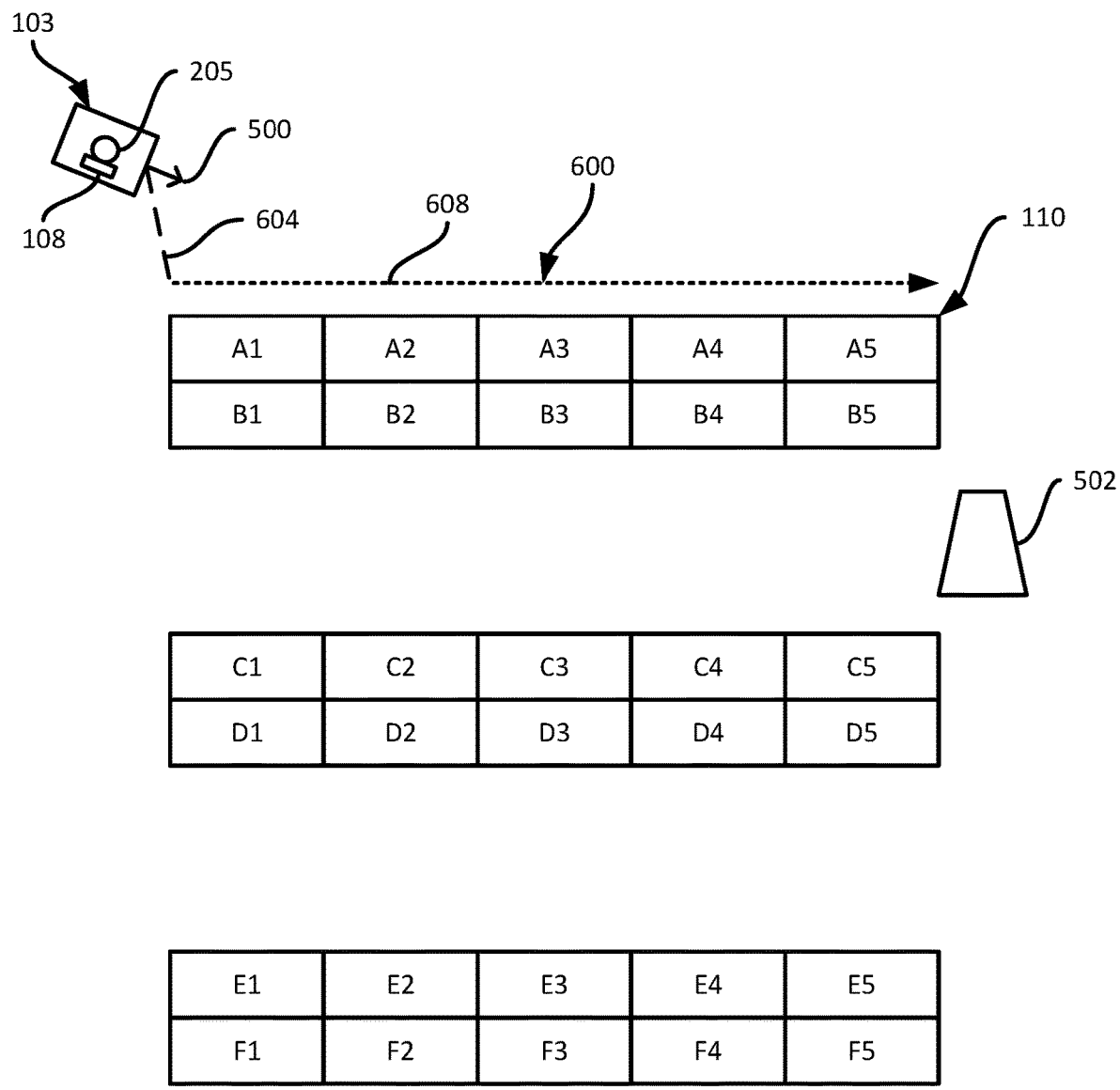
FIG. 6 is a diagram illustrating an example performance of block 415 of the method of FIG. 4.

At block 415, the apparatus 103 generates a path for the active fragment. For example, the task manager 320 can instruct the navigator 324 to generate a path that traverses the modules of the active task fragment (i.e. the modules A1 to A5, in the present example). Turning to FIG. 6, the modules 110 are shown along with the apparatus 103 and a path 600 generated by the navigator 324 at block 415. The generation of a path at block 415 can include generating a path to a starting location for the task fragment (e.g. from the current location of the apparatus 103 to the module A1, in the present example), in addition to generating a path traversing the sub-regions of the task fragment itself. The path 600 therefore includes a taxi portion 604 from the current location of the apparatus 103, and an execution portion 608 that traverses the modules A1 to A5, for performance of the data capture task. In some embodiments, the portions 604 and 608 are generated as distinct paths (e.g. responsive to separate instructions from the task manager 320 to the navigator 324).

Referring again to FIG. 4, following path generation, at block 420 the task manager 320 determines whether a proportion of the modules of the active task fragment that can only be reached from the current location of the apparatus 103 by taxiing (e.g. by taxiing any distance, or in some embodiments by taxiing more than a configurable threshold distance) exceeds a configurable threshold. In other words, for the task fragment A, the task manager 320 determines a proportion of the modules A1-A5 that can only be reached via the taxi portion 604 of the path 600. Those modules are referred to as "inaccessible" modules, although as will be understood, they are simply inaccessible without taxiing, rather than being entirely inaccessible. That proportion is compared to a threshold (e.g. 20%, although a wide variety of other thresholds are also contemplated). As seen in FIG. 6, all of the modules A1-A5 can only be reached via the taxi portion 604 of the path (i.e. the proportion of inaccessible modules is 100%), and the determination at block 420 is therefore negative. When the determination is affirmative, the task manager 320 updates the status of the inaccessible modules at block 425, as will be discussed further below.

In the present example, following a negative determination at block 420, the apparatus 103 proceeds to block 430. At block 430 the task manager 320 initiates the execution of the active task fragment selected at block 410 by sending instructions to the navigator 324 and the data capture controller 328 to travel along the path 600 generated at block 415 and to begin capturing data, respectively. More specifically, the task manager 320 is configured to transmit an instruction to begin navigation for the active task fragment to the navigator 324, and to transmit an instruction to begin data capture for the active task fragment to the data capture controller 328.

The navigator 324 is configured, during the performance of block 430, to control the locomotive mechanism 203 and associated components of the apparatus 103, to travel along the path 600 generated at block 415 for the active task fragment. The navigator 324 achieves such control via one or more navigation sensors (e.g., lidar sensors), the map stored in the repository 312 and the current pose of the apparatus 103, which is periodically updated. During the traverse of the modules 110 corresponding to the active task fragment, the data capture controller 328 is configured to control any one or more of the sensors 108 (e.g. the cameras 207 and depth sensors 209) to capture image data depicting the sub-regions the apparatus 103 is traversing and store the image data in the repository 312.

As the apparatus 103 travels along the sub-regions corresponding to the active task fragment, the navigator 324 is configured to monitor the current pose of the apparatus 103. The current pose is periodically reported to the task manager 320. The navigator 324 also notifies the task manager 320 of each sub-region that has been successfully traversed. Thus, the task manager 320 can update status data corresponding to the modules of the active task fragment.

During travel according to the path 600, at block 435 the task manager 320 determines, based on the current pose of the apparatus 103 received from the navigator 324, whether any of the execution criteria generated at block 405 are satisfied. That is, the task manager 320 compares the current location and direction of the apparatus 103 with the areas 508 and directions 512. In particular, the comparison of current pose to execution criteria 504 at block 435 is performed only during taxiing (i.e. while traveling the taxi portion 604 of the path 600). Further, the execution criteria 504 corresponding to the active task fragment are omitted from the comparison at block 435. Thus, while traveling the taxi portion 604, the task manager 320 does not assess whether the execution criteria for any of the modules A1-A5 are satisfied.

When the determination at block 435 is affirmative, the task manager 320 updates the task fragment sequence at block 440, as will be discussed further below. In the present example, as will be apparent from FIG. 6, the determination at block 435 is negative as the apparatus 103 travels the taxi portion 604, as no execution criteria 504 for non-active modules will be satisfied. The apparatus 103 therefore proceeds to block 445.

At block 445 the navigator 324 determines whether the path 600 is obstructed. When an obstacle is detected, the navigator 324 generates an updated path at block 415 (e.g. for the modules 110 remaining to be traversed). When no obstacle is detected, execution of the path 600 continues. At block 450, when the active task fragment is complete (i.e. when each module 110 of the active task fragment has been traversed or marked incomplete, as will be discussed below), the task manager 320 selects the next task fragment from the sequence. Thus, referring to FIG. 7, in which the apparatus 103 is shown having reached the end of the path 600, the task manager 320 selects the next task fragment from the sequence of Table 2, and performance of the method 400 returns to block 415. Table 3 contains status data indicating that the modules A1-A5 are complete (and the modules A1-A5 are illustrated with shading to indicate completion in FIG. 7). Further, Table 3 indicates that the task fragment B has been selected as the active task fragment.

TABLE 3

Updated Task Fragment Sequence

| Fragment ID | Module ID | Status |
|---|---|---|
| A | A1 | Complete: A1-A5 |
|   | A2 |   |
|   | A3 |   |
|   | A4 |   |
|   | A5 |   |
| B | B5 | Active |
|   | B4 |   |
|   | B3 |   |
|   | B2 |   |
|   | B1 |   |
| C | C1 |   |
|   | C2 |   |
|   | C3 |   |
|   | C4 |   |
|   | C5 |   |
| D | D5 |   |
|   | D4 |   |
|   | D3 |   |
|   | D2 |   |
|   | D1 |   |

TABLE 3-continued

Updated Task Fragment Sequence

| Fragment ID | Module ID | Status |
|---|---|---|
| E | E1 |   |
|   | E2 |   |
|   | E3 |   |
|   | E4 |   |
|   | E5 |   |

Figure 7:
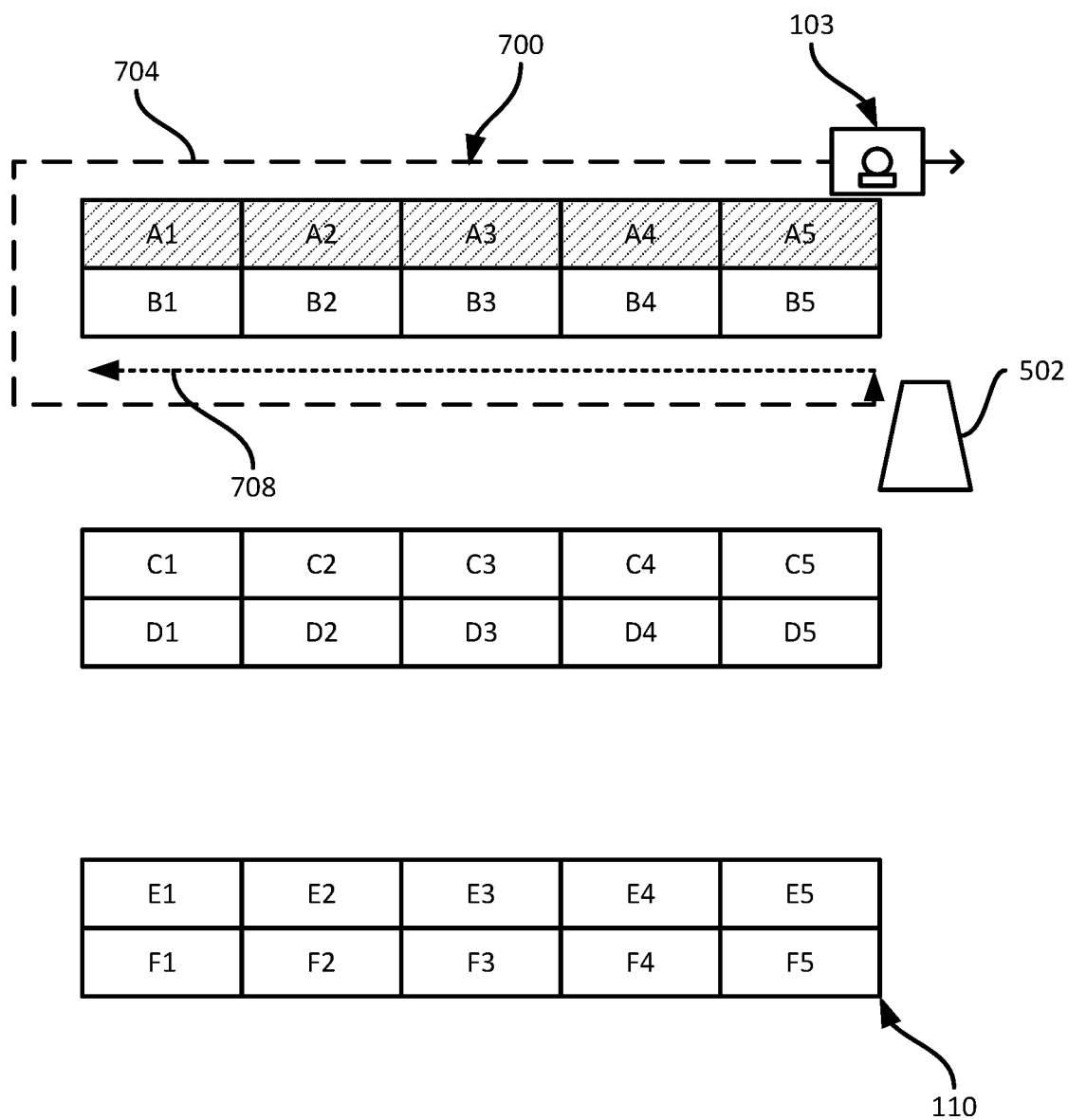
FIG. 7 is a diagram illustrating a further example performance of block 415 of the method of FIG. 4.

At block 415, the navigator 324 generates a path for the active task fragment, shown as a path 700 in FIG. 7. Of particular note, the obstacle 502 prevents the apparatus 103 from reaching the module B5 without taxiing back towards the module A1 before returning along the next aisle to reach the module B5. Thus, the path 700 includes a lengthy taxi portion 704, followed by an execution portion 708. The determination at block 420 is negative, as none of the "B" modules can be reached without taxiing. Thus at block 430 the apparatus 103 begins traveling along the path 700.

Figure 8:
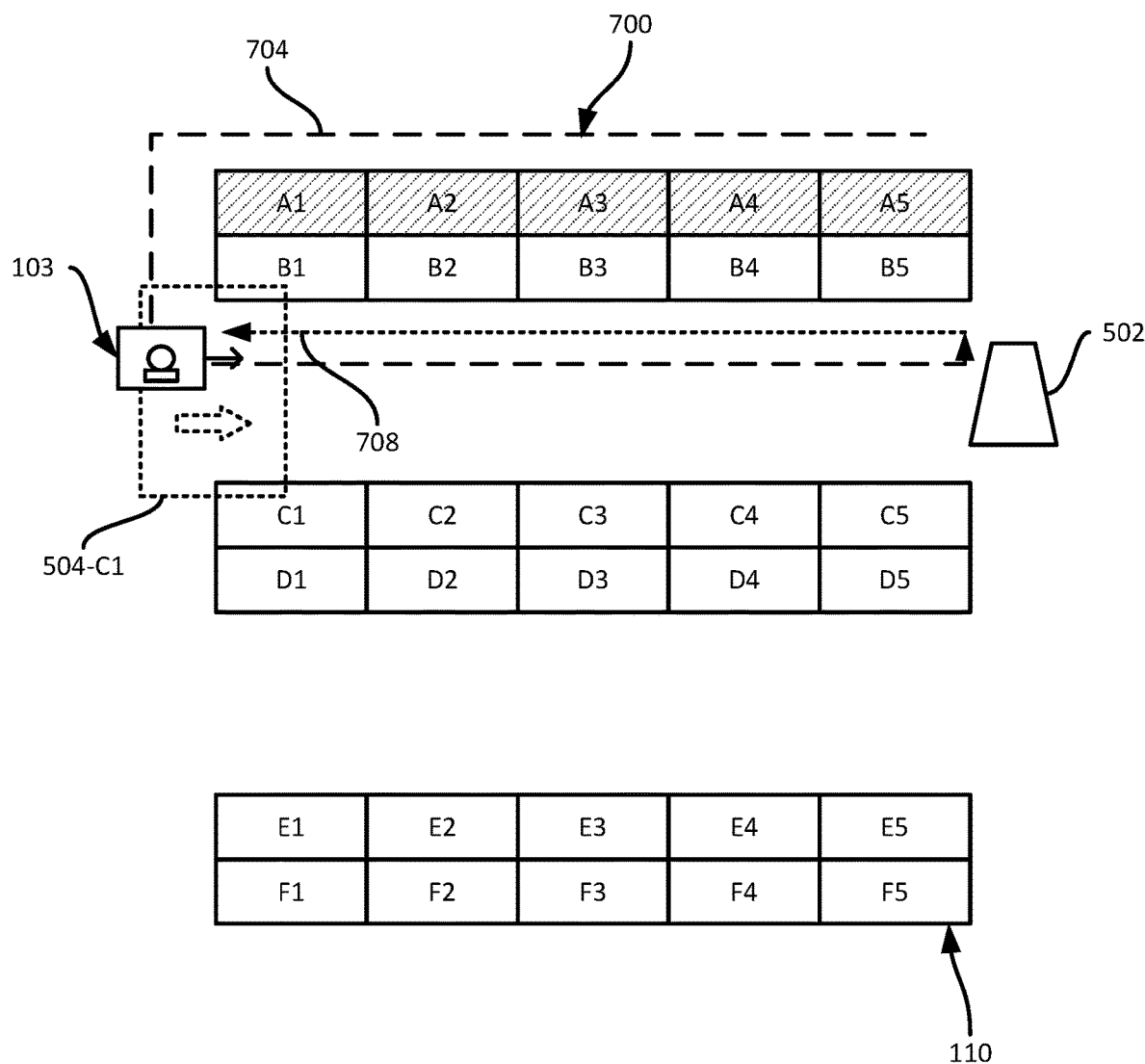
FIG. 8 is a diagram illustrating an example performance of block 435 of the method of FIG. 4.

Referring now to FIG. 8, when the apparatus 103 has traveled along part of the taxi portion 704, the current pose of the apparatus 103 satisfies the execution criteria 504-C1 corresponding to the module C1. The determination at block 435 is therefore affirmative. At block 440 the task manager 320 updates the sequence and selects a new active segment based on the updated sequence. In particular, the task manager 320 updates the sequence to place the task fragment C above the task fragment B, as shown below in Table 4, and to select the task fragment C as the active task fragment. Performance of the method 400 then returns to block 415, at which the task manager 320 instructs the navigator 324 to generate a path for the task fragment C.

TABLE 4

Updated Task Fragment Sequence

| Fragment ID | Module ID | Status |
|---|---|---|
| A | A1 | Complete: A1-A5 |
|   | A2 |   |
|   | A3 |   |
|   | A4 |   |
|   | A5 |   |
| C | C1 | Active |
|   | C2 |   |
|   | C3 |   |
|   | C4 |   |
|   | C5 |   |
| B | B5 |   |
|   | B4 |   |
|   | B3 |   |
|   | B2 |   |
|   | B1 |   |
| D | D5 |   |
|   | D4 |   |
|   | D3 |   |
|   | D2 |   |
|   | D1 |   |
| E | E1 |   |
|   | E2 |   |
|   | E3 |   |
|   | E4 |   |
|   | E5 |   |

Figure 9:
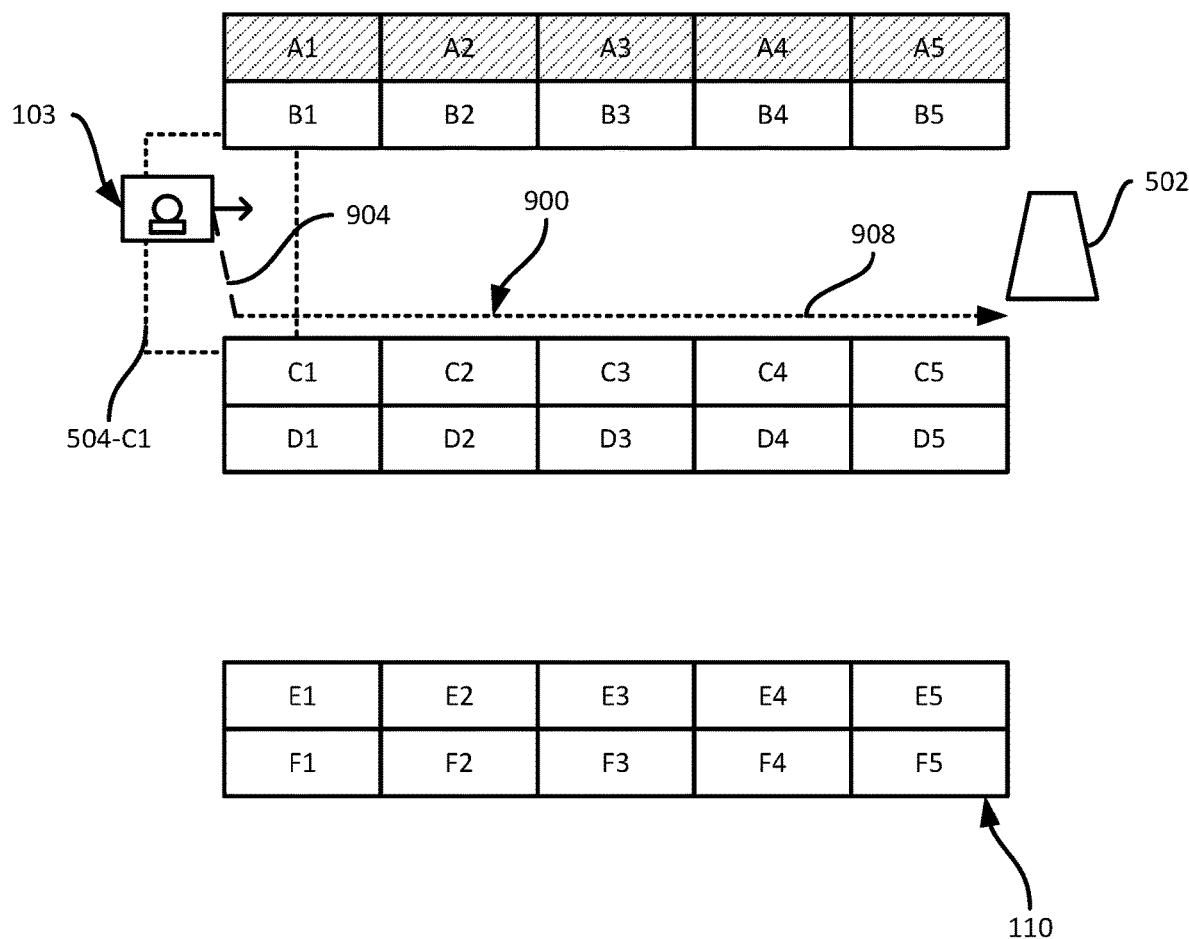
FIG. 9 is a diagram illustrating an example performance of block 440 of the method of FIG. 4.

Turning to FIG. 9, a path 900 is shown, including a taxi portion 904 and an execution portion 908, for completing the task fragment C. At block 430, the apparatus 103 travels along the path 900 to complete the data capture task for each of the modules C1-C5. As will be apparent, the determination at block 435 is negative, as is the determination at block 445. When the path 900 is complete, the task manager 320 selects the next task fragment according to the updated sequence (i.e. the task fragment B in the present example). Repeating blocks 415 to 450 for the task fragment B leads to completion of the task fragment B, and the selection of the next task fragment, which in the present example is the task fragment D.

Figure 10:
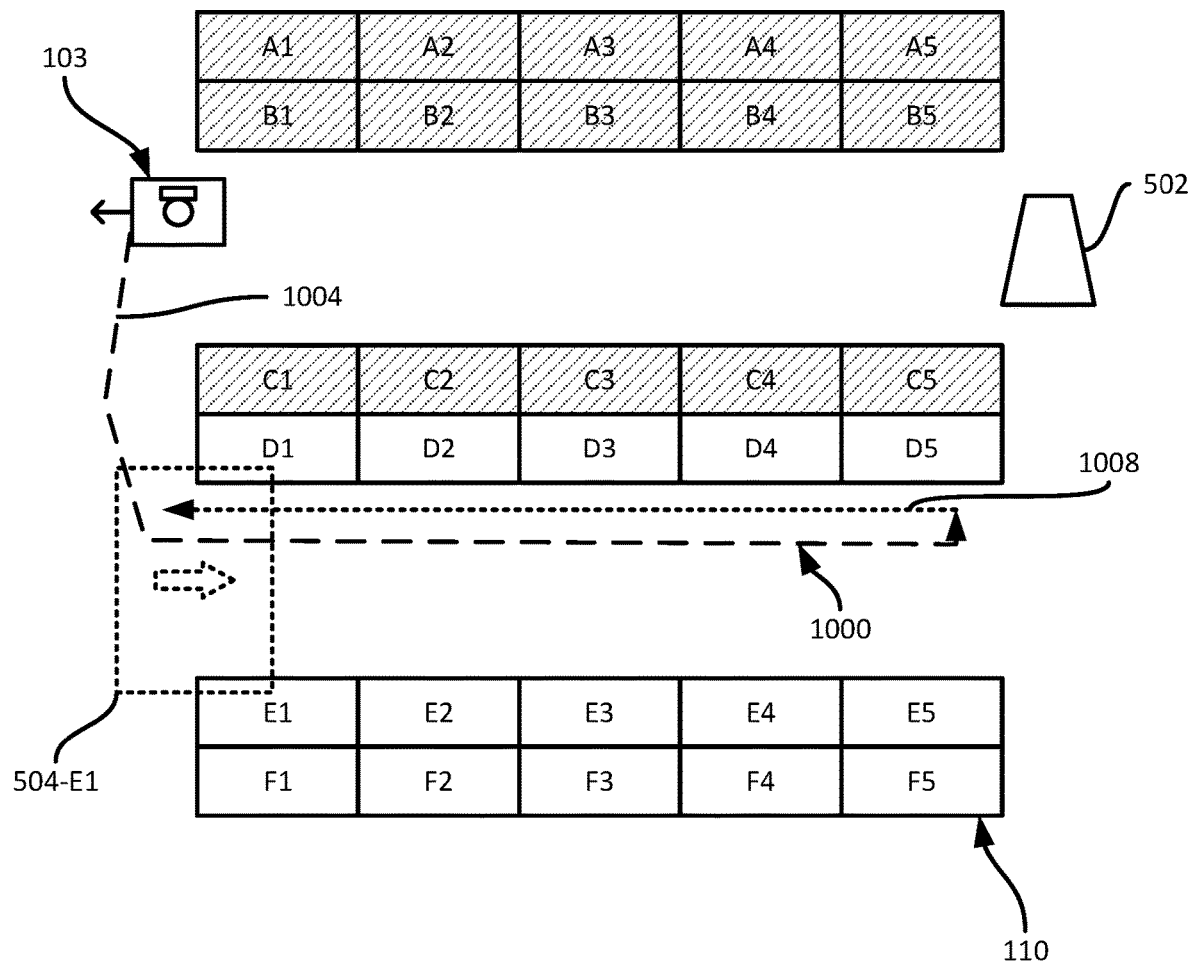
FIG. 10 is a diagram illustrating an example performance of blocks 415 and 435 of the method of FIG. 4.

FIG. 10 illustrates the apparatus 103 following the completion of the task fragment B and selection of the task fragment D as the active task fragment. Table 5 illustrates the updated sequence and status of the task fragments.

TABLE 5

| Updated Task Fragment Sequence | | |
| --- | --- | --- |
| Fragment ID | Module ID | Status |
| A | A1 | Complete: A1-A5 |
|   | A2 |   |
|   | A3 |   |
|   | A4 |   |
|   | A5 |   |
| C | C1 | Complete: C1-C5 |
|   | C2 |   |
|   | C3 |   |
|   | C4 |   |
|   | C5 |   |
| B | B5 | Complete: B1-B5 |
|   | B4 |   |
|   | B3 |   |
|   | B2 |   |
|   | B1 |   |
| D | D5 | Active |
|   | D4 |   |
|   | D3 |   |
|   | D2 |   |
|   | D1 |   |
| E | E1 |   |
|   | E2 |   |
|   | E3 |   |
|   | E4 |   |
|   | E5 |   |

FIG. 10 also illustrates a path 1000 generated at block 415 for the task fragment D, including a taxi portion 1004 and an execution portion 1008. As will be apparent from FIG. 10, during travel along the taxi portion 1004 towards the module D5, the apparatus 103 will satisfy the execution criteria 504-E1 corresponding to the module E1. Therefore, following another affirmative determination at block 435, the task manager 320 updates the sequence to place the task fragment E ahead of the task fragment D, and initiates path generation at block 415 for the task fragment E. Table 6 illustrates the further updated sequence

TABLE 6

| Updated Task Fragment Sequence | | |
| --- | --- | --- |
| Fragment ID | Module ID | Status |
| A | A1 | Complete: A1-A5 |
|   | A2 |   |
|   | A3 |   |
|   | A4 |   |
|   | A5 |   |
| C | C1 | Complete: C1-C5 |
|   | C2 |   |
|   | C3 |   |
|   | C4 |   |
|   | C5 |   |

TABLE 6-continued

| Updated Task Fragment Sequence | | |
| --- | --- | --- |
| Fragment ID | Module ID | Status |
| B | B5 | Complete: B1-B5 |
|   | B4 |   |
|   | B3 |   |
|   | B2 |   |
|   | B1 |   |
| E | E1 | Active |
|   | E2 |   |
|   | E3 |   |
|   | E4 |   |
|   | E5 |   |
| D | D5 |   |
|   | D4 |   |
|   | D3 |   |
|   | D2 |   |
|   | D1 |   |

Figure 11:
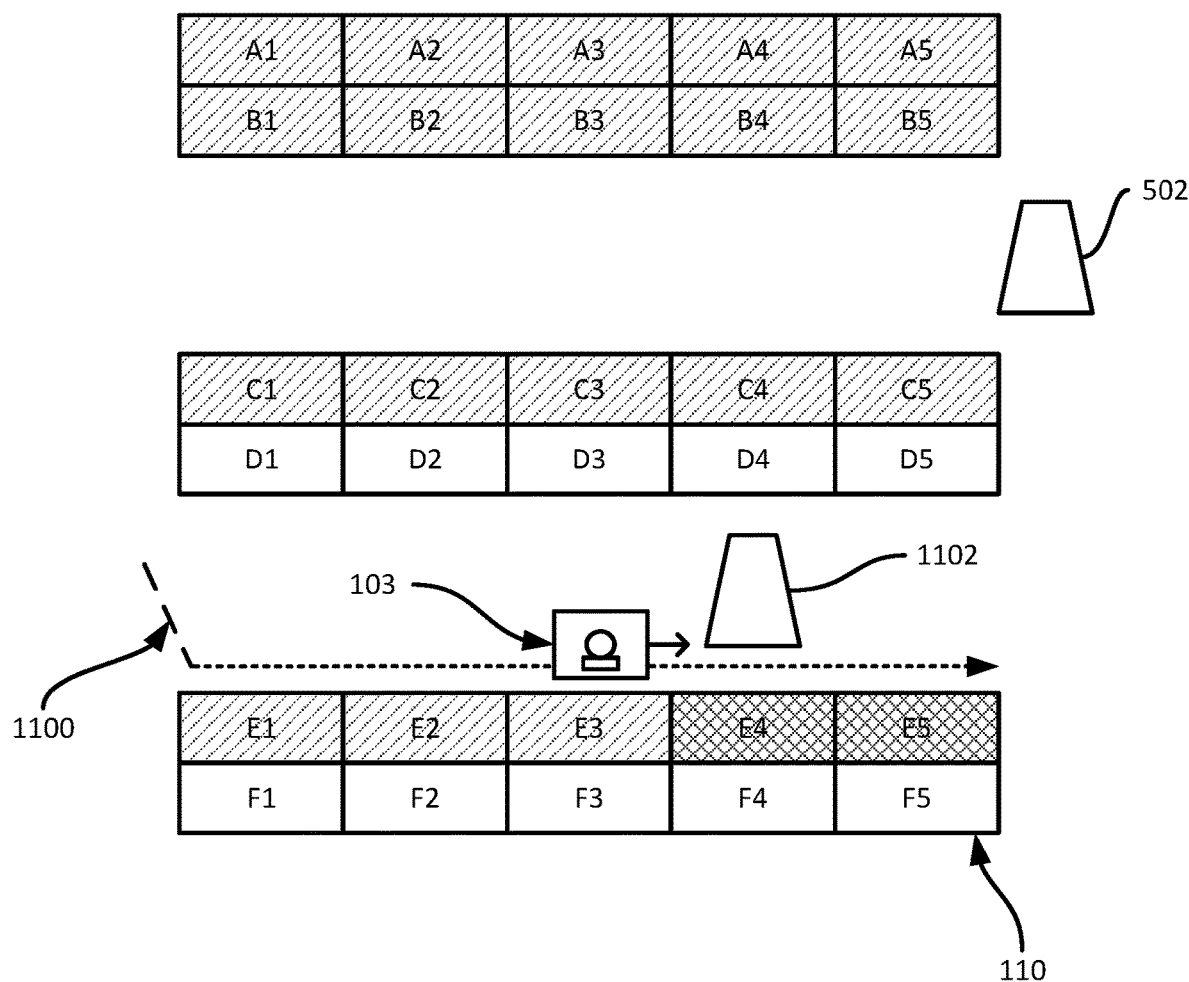
FIG. 11 is a diagram illustrating an example performance of blocks 420 and 425 of the method of FIG. 4.

Turning to FIG. 11, a path 1100 is shown as generated at block 415 for the task fragment E, with the apparatus 103 having traveled along part of the path 1100 and completed the traversal of the modules E1, E2 and E3. FIG. 11 also illustrates that an obstacle 1102, such as a person, has been detected by the apparatus 103. The module E4 is obstructed by the obstacle 1102 (i.e. data capture of the module E4 cannot be completed). Further, the module E5 cannot be reached by continuing to follow the path 1100. Therefore, the determination at block 445 is affirmative, and the apparatus 103 returns to block 415 to generate an updated path to reach the module E5. As seen in FIG. 11, the module E5 can be reached, for example, by traveling back towards the module E1 and then past the modules F1 to F5.

At block 420, the module E5 is considered an inaccessible module, because it can only be reached by taxiing more than a threshold distance. In some embodiments, the assessment at block 420 can be performed in conjunction with path generation at block 415, and includes determining whether a path can be planned to reach the relevant module(s) (i.e. the module E5 in the present example) without leaving the current aisle. In either implementation, the module E5 is inaccessible. Further, the module E5 constitutes only one fifth (20%) of the task fragment E. Therefore, the determination at block 420 is affirmative, and at block 425 the task manager 320 ignores the inaccessible modules, for example by storing status data indicating that the inaccessible modules have been skipped, as shown in Table 7 below.

Following the performance of block 425, the apparatus 103 can return to block 415 to generate a path for the active task fragment that omits the ignored modules from block 425. In the present example, it will be apparent that when the module E5 is ignored, no further modules remain to be completed in the task fragment E, and that further path planning is no longer necessary for the task fragment E. The task manager 320 can therefore also determine, following block 425, whether the active task fragment is complete as a result of the performance of block 425. When the active task fragment is complete, the task manager 320 proceeds to block 450 before returning to block 415. In the present example, therefore the task manager 320 selects the task fragment D as the active task fragment, and returns to block 415. The updated status of the task fragments is shown in Table 7.

TABLE 7

Updated Task Fragment Sequence

| Fragment ID | Module ID | Status |
|---|---|---|
| A | A1 | Complete: A1-A5 |
|   | A2 |   |
|   | A3 |   |
|   | A4 |   |
|   | A5 |   |
| C | C1 | Complete: C1-C5 |
|   | C2 |   |
|   | C3 |   |
|   | C4 |   |
|   | C5 |   |
| B | B5 | Complete: B1-B5 |
|   | B4 |   |
|   | B3 |   |
|   | B2 |   |
|   | B1 |   |
| E | E1 | Complete: E1-E3 |
|   | E2 | Obstructed: E4 |
|   | E3 | Skipped: E5 |
|   | E4 |   |
|   | E5 |   |
| D | D5 | Active |
|   | D4 |   |
|   | D3 |   |
|   | D2 |   |
|   | D1 |   |

As seen above, the task fragment D is indicated as the active task fragment, and the module E5 is indicated as having been skipped (i.e. ignored), as completing data capture for the module E5 alone would require the apparatus 103 to taxi a substantial distance.

Figure 12:
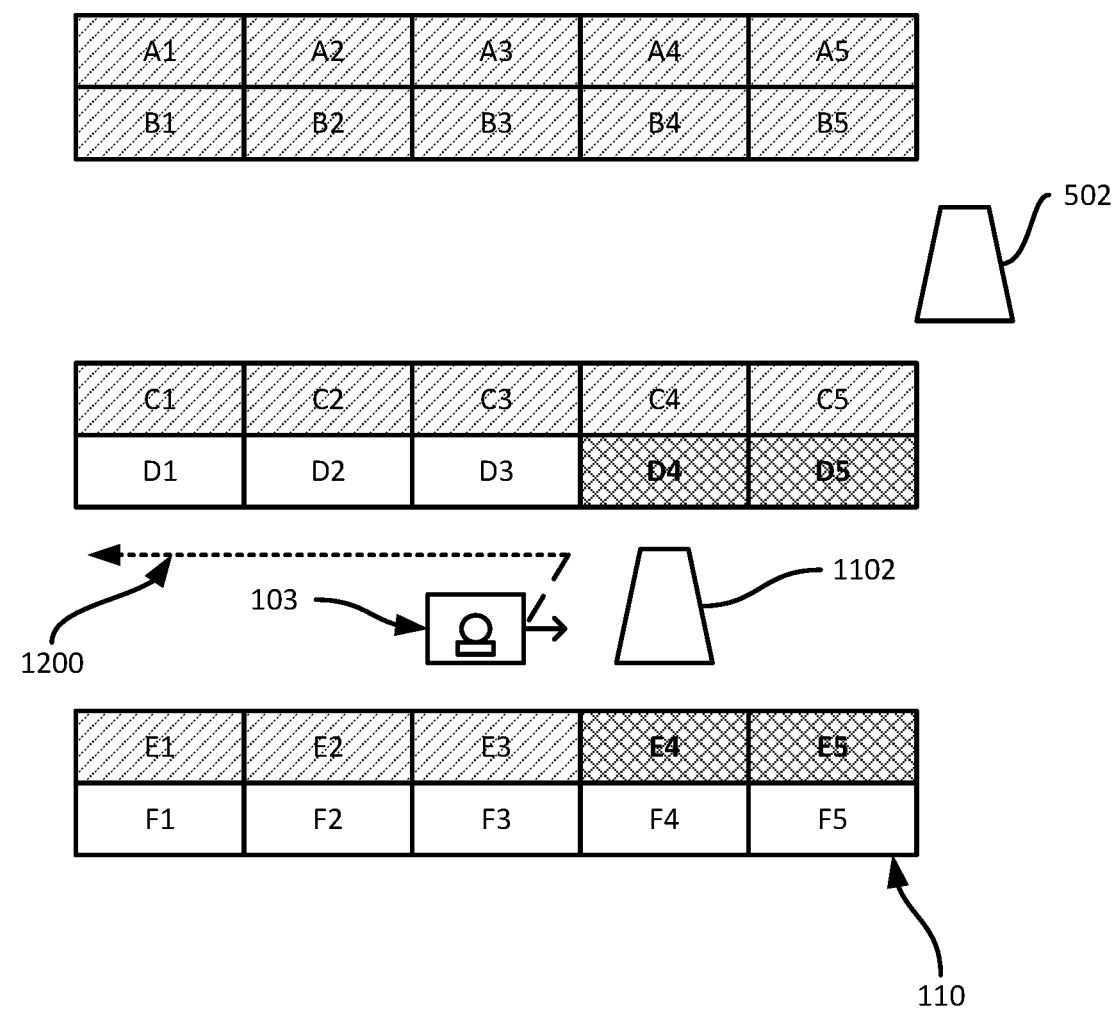
FIG. 12 is a diagram illustrating another example performance of blocks 420 and 425 of the method of FIG. 4.

Following selection of the task fragment D as the active task fragment, a path 1200 as illustrated in FIG. 12 is generated for the task fragment D. As shown in FIG. 12, the modules D4 and D5 have been marked as obstructed and skipped, respectively. Specifically, the module D4 cannot be reached as a result of the obstacle 1102, and the module D5 has been ignored following a further affirmative determination at block 420. More specifically, planning a path from the location of the apparatus 103 shown in FIG. 12 to the module D5 requires a substantial taxiing distance (e.g. above the threshold mentioned earlier), while the modules D3, D2 and D1 can be reached with minimal taxiing (e.g. without leaving the aisle the apparatus 103 is currently in). The module D5 is therefore ignored at block 425, and block 415 is repeated to generate the path 1200 shown. Traveling along the path 1200 results in the completion of data capture for the modules D3, D2 and D1.

When the task fragment D is complete, the task fragments received at block 405 will have been completed, with the exception of the modules D4, D5, E4 and E5. The task manager 320 can report the status of the task fragments to the server 101, for example, and the server 101 can generate a further set of task fragments for subsequent execution, incorporating any previously incomplete modules (i.e. the modules D4, D5, E4 and E5).

Through the generation of execution criteria and the performance of block 435, the apparatus 103 may therefore detect conditions in which time spent traveling can instead be used to perform data capture or other tasks, thus reducing the time spent taxiing by the apparatus 103. Further, the determination at block 420 may further avoid suboptimal taxiing by the apparatus to reach isolated modules, instead deferring the performance of tasks for those modules until a later time (e.g. when the obstacle 1102 may no longer be present).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method in a navigational controller, the method comprising:
   obtaining (i) a plurality of task fragments identifying respective sets of sub-regions in a facility, and (ii) an identifier of a task to be performed by a mobile automation apparatus at each of the sets of sub-regions;
   selecting a first active one of the task fragments according to a sequence specifying an order of execution of the task fragments;
   generating a path including (i) a taxi portion from a current position of the mobile automation apparatus to the sub-regions identified by the first active task fragment, and (ii) an execution portion traversing the sub-regions identified by the first active task fragment according to the sequence specifying the order of execution of the task fragments;
   during travel along the taxi portion to the sub-regions identified by the first active task fragment, determining, based on a current pose of the mobile automation apparatus, whether to initiate execution of another task fragment out of the sequence specifying the order of execution of the task fragments;
   when the determination is affirmative, interrupting travel along the taxi portion to the sub-regions identified by the first active task fragment, to perform the other task fragment prior to arriving to the sub-regions identified by the first active task fragment;
   identifying as inaccessible at least one subregion of a task fragment that requires greater than a threshold distance to be reached by taxiing; and
   performing the at least one inaccessible subregion after all other task fragments have been performed.

2. The method of claim 1, further comprising:
   while traveling along the execution portion of the path, performing the identified task.

3. The method of claim 2, wherein the identified task is a data capture task.

4. The method of claim 1, further comprising:
   responsive to updating the sequence, repeating generating the path and determining whether to initiate execution of another task fragment.

5. The method of claim 1, further comprising:
   responsive to generating the path, identifying inaccessible ones of the set of sub-regions identified by the first active task fragment;
   determining a proportion of the set of sub-regions represented by the inaccessible sub-regions; and
   when the proportion is below a threshold, ignoring the inaccessible sub-regions.

6. The method of claim 5, wherein identifying inaccessible ones of the set of sub-regions includes determining that an inaccessible one of the set of sub-regions cannot be reached without taxiing.

7. The method of claim 1, further comprising:
   for each sub-region identified by each task fragment, generating execution criteria;
   wherein determining whether to initiate execution of another task fragment includes comparing the current pose of the mobile automation apparatus to the execution criteria.

8. The method of claim 7, wherein the execution criteria include a proximity criterion and a directional criterion.

9. The method of claim 1, wherein obtaining the task fragments includes receiving the task fragments at the mobile automation apparatus from a server.

10. A mobile automation apparatus, comprising:
    a locomotive assembly;
    a data capture sensor; and
    a navigational controller configured to:
        obtain (i) a plurality of task fragments identifying respective sets of sub-regions in a facility, and (ii) an identifier of a task to be performed at each of the sets of sub-regions;
        select a first active one of the task fragments according to a sequence specifying an order of execution of the task fragments;
        generate a path including (i) a taxi portion from a current position of the mobile automation apparatus to the sub-regions identified by the first active task fragment, and (ii) an execution portion traversing the sub-regions identified by the first active task fragment according to the sequence specifying the order of execution of the task fragments;
        control the locomotive assembly to travel along the path;
        during travel along the taxi portion to the sub-regions identified by the first active task fragment, determine, based on a current pose of the mobile automation apparatus, whether to initiate execution of another task fragment out of the sequence specifying the order of execution of the task fragments;
        when the determination is affirmative, interrupt travel along the taxi portion to the sub-regions identified by the first active task fragment, to perform the other active task fragment prior to arriving to the sub-regions identified by the first active task fragment;
        identify as inaccessible at least one subregion of a task fragment that requires greater than a threshold distance to be reached by taxiing; and
        perform the at least one inaccessible subregion after all other task fragments have been performed.

11. The mobile automation apparatus of claim 10, wherein the navigational controller is further configured, during travel along the execution portion of the path, perform the identified task.

12. The mobile automation apparatus of claim 11, wherein the identified task is a data capture task, and wherein the navigational controller is configured to control the data capture sensor to perform the data capture task.

13. The mobile automation apparatus of claim 10, wherein the navigational controller is further configured, responsive to updating of the sequence, to repeat the generation of the path and the determination of whether to initiate execution of another task fragment.

14. The mobile automation apparatus of claim 10, wherein the navigational controller is further configured, responsive to generation of the path, to:
identify inaccessible ones of the set of sub-regions identified by the first active task fragment;
determine a proportion of the set of sub-regions represented by the inaccessible sub-regions; and
when the proportion is below a threshold, ignore the inaccessible sub-regions.

15. The mobile automation apparatus of claim 14, wherein the navigational controller is further configured, in order to identify the inaccessible ones of the set of sub-regions, to determine that an inaccessible one of the set of sub-regions cannot be reached without taxiing.

16. The mobile automation apparatus of claim 10, wherein the navigational controller is further configured, for each sub-region identified by each task fragment, to generate execution criteria; and
wherein the navigational controller is further configured, in order to determine whether to initiate execution of another task fragment, to compare the current pose of the mobile automation apparatus to the execution criteria.

17. The mobile automation apparatus of claim 16, wherein the execution criteria include a proximity criterion and a directional criterion.

18. The mobile automation apparatus of claim 10, wherein the navigational controller is configured, in order to obtain the task fragments, to receive the task fragments from a server.

* * * * *